United States Patent [19]

Akuto et al.

[11] Patent Number: 5,346,785
[45] Date of Patent: Sep. 13, 1994

[54] PHOTOCHARGEABLE AIR BATTERY

[75] Inventors: Keiji Akuto, Sayama; Naoki Kato, Higashimurayama; Tsutomu Ogata, Sayama; Masaaki Takeuchi, Ootsu, all of Japan

[73] Assignee: Nippon Telegraph and Telephone Corporation, Tokyo, Japan

[21] Appl. No.: 5,301

[22] Filed: Jan. 19, 1993

[30] Foreign Application Priority Data

Jan. 21, 1992 [JP] Japan ................................ 4-008715
Jan. 21, 1992 [JP] Japan ................................ 4-008716

[51] Int. Cl.⁵ ........................................ H01M 12/00
[52] U.S. Cl. ..................................... 429/111; 204/96
[58] Field of Search ......................... 429/111; 204/96

[56] References Cited

U.S. PATENT DOCUMENTS

3,401,062  9/1968  Lyons .
4,042,758  8/1977  Weinstein et al. .
4,064,326  12/1977  Manassen et al. .
4,128,704  12/1978  McKinzie et al. .
4,656,103  4/1987  Reichman et al. ................ 429/111

FOREIGN PATENT DOCUMENTS

3618881  10/1987  Fed. Rep. of Germany .

OTHER PUBLICATIONS

Patent Abstracts of Japan, vol. 14, No. 344 (E-955) (4287) 25 Jul. 1990, & JP-A-21 19 067 (Brother Ind Ltd.).
Extended Abstracts, vol. 79, No. 1, 1 May 1979, Princeton, N.J. US, pp. 623-624, P. G. P. Ang et al., 'Photoelectrochemical Solar Cell Using A Fuel Cell Oxygen Cathode'.
Ang, Peter G. P. & Sammells, Anthony F. *Photoelectrochemical Systems with Energy Storage*, pp. 207~222 (May 14, 1980).
Bratin, P. & Tomkiewicz, Micha. "Transport Properties of Nafion Membranes for Use in Three-Electrode Photoelectrochemical Storage Cells." *J. Electro-chem. Soc.:* Electrochemical Science and Technology. vol. 129, No. 11, pp. 2469~2473 (Nov. 1982).
Yonezawa, Y., et al. "A Photochemical Storage Battery with an n-GaP Photoelectrode." *Bull. Chem. Soc. Jpn.*, vol. 56, No. 10, pp. 2873~2876 (1983).
Gerritsen, H. J., Ruppel, W. & Wurfel, P. "A Photoelectrochemical Storage Cell with n-CdSe and p-CdTe Electrodes." *J. Electrochem. Soc.:* Electro--Chemical Science and Technology. vol. 131, No. 9, pp. 2037~2041 (Sep. 1984).
Yonezawa, Y. & Haneda, H. "A Photo Rechargeable Battery." *Kogyo Zairyo.* vol. 37, No. 4, pp. 18~22 (Mar. 1989).
Akuto, Keiji, et al. "Photochargeable Air Batteries." *Electronic Information Communication Society Technology Research Publication.* vol. 91, No. 439, pp. 14~20 (1992 Jan. 24).

*Primary Examiner*—Prince Willis, Jr.
*Assistant Examiner*—M. Nuzzolillo
*Attorney, Agent, or Firm*—Finnegan, Henderson, Farabow, Garrett & Dunner

[57] ABSTRACT

A photochargeable air battery is disclosed possessing a negative electrode 22 which discharges by oxidation of metal material 22a, a positive electrode 21 comprising a oxygen catalyst, electrolyte 23 filling the inside of battery case 27 between negative electrode 22 and positive electrode 21, and battery case 27 housing positive electrode 21, negative electrode 22 and electrolyte 23 in addition to possessing light receptor 22a which injects light into negative electrode 22. As a result, discharging is performed by oxidation of metal material 22a comprising negative electrode 22, while charging is performed by reducing the oxidized metal material by means of irradiating light from light receptor 27a onto the metal material 22 which is oxidized by this discharging. Consequently, a photochargeable air battery with a simplified construction which does not require a large amount of electrolyte or a switch, can be achieved since the cell reaction is not based on redox reactions and reduction of electrolyte 23 does not occur. On the other hand, by exciting electrons using light energy, it is also possible to electrically communicate photo-electrode 30 which reduces metal material 22a oxidized by these electrons to negative electrode 22.

17 Claims, 20 Drawing Sheets

(C)

PHOTOCHARGEABLE AIR BATTERY

BACKGROUND OF THE INVENTION

1. Field of the Invention

The present invention relates to a secondary battery with charging and discharging capabilities, in particular to a photochargeable air battery that is discharged by oxidation and charged by light energy.

2. Relevant Art

Experiments that attempt to charge secondary batteries using the light energy of visible sunlight and the like have been conducted in the past. As this type of battery, photochargeable batteries are known which combine secondary batteries such as amorphous silicon solar cells, nickel-cadmium batteries and lead-acid batteries (J. Electrochem. Soc. Vol. 131, No. 9, pp. 2037–2041:1984). These photochargeable batteries will be explained with reference to FIGS. 21–22. FIG. 21 shows a perspective view of a prior art photochargeable battery, and FIG. 22 shows an equivalent circuit of the photochargeable battery in FIG. 21. The photochargeable battery shown in FIGS. 21 and 22 comprises a solar cell 1, a storage battery 2 which stores electrical power obtained by this solar cell 1, a voltage regulation circuit 3 which regulates the voltage generated in solar cell 1, and a check diode 4 which prevents flow of the electric current from storage battery 2 to solar cell 1. Photochargeable battery 2 functions in a two-step (indirect) process which comprises generation of electrical power using solar cell 1, and storage of the electrical power obtained by this solar cell 1 using storage battery 2.

However, this type of prior art photochargeable battery has disadvantages in that as a result of the required structural components of the voltage regulation circuit 3, check diode 4 and the like, the structure of this photochargeable battery is extremely bulky and complex.

As well, there exist additional problems in that in the proper functioning of the prior art photochargeable battery it is necessary to regulate the electric current appropriated for charging the electrical power generated by solar cell 1 to storage battery 2, and in order to perform this regulation a large amount of energy loss take place. In addition, the aforementioned photochargeable battery possesses, as a result of passing through a light→electric→electrochemical three-phase energy conversion step, problems such as an increase in the number of structural components for this energy conversion step, or an increase in the energy loss attributed to this energy conversion step.

Further disadvantages exist in the manufacturing of solar cell 1, as comparatively high grade manufacturing equipment such as p-n junction equipment is required, in addition to other difficulties outside of manufacturing.

FIG. 23 shows a prior art photochargeable battery (Kogyozairyo, 1989, No. 3, Vol. 7-4, pp. 18–22). This photochargeable battery is equipped with transparent glass substrate 7, P-type semiconductor 8, I-type semiconductor 9, collecting elements 10, 11, cathode 12, anode 13, solid electrolyte 14, passivation layer 15, and transparent electrode 16. However, as in the aforementioned, the construction of this photochargeable battery is complex and drawbacks exist such as problems in manufacturing the semiconductors as well as low energy density.

FIG. 24 shows a structural view of a prior art photochemical chargeable battery (Faraday Discuss. Chem. Soc. 70, pp. 207–222:1980). In the Fig. battery container 17, cover 17a for sealing tightly the battery container, separator 18, photo-electrode 19 formed from an N-type semiconductor, electrode 20a for charging, and electrode 20b for discharging are shown.

FIG. 25 shows a simple structure and energy level of a photochemical chargeable battery (Bull. Chem. Soc. Jpn., 56. pp. 2873–2876:1983).

These photochemical chargeable batteries utilize an electrochemically distinct semiconductor-electrolyte, in particular, they utilize an energy band curve generated at the time of contact of semiconductor electrode with the electrolyte, and electrochemically accumulate this light energy. The photo-conversion portion of the photochemical chargeable battery shown in FIG. 24 is formed by simply dipping semiconductor electrode 19 into electrolyte S, and thus in regards to this point, it is superior when compared with prior art photochargeable batteries requiring solar batteries and the like as shown in FIGS. 21 and 22.

However, as shown in FIG. 25, in shifting from discharging to charging (or vice versa), there exist a drawback in that the electrode connection must be changed using a switch or the like. Thus, disadvantageous exist in that the reactions of these batteries are based on electrolytic reduction-oxidation reactions, and thus in order to increase capacity a large amount of electrolyte is required, and generally a large energy density is undesirable.

SUMMARY OF THE INVENTION

The purpose of the present invention is to provide a high energy density photochargeable air battery possessing superior energy-saving abilities in that a battery charger is not necessary, which is discharged by oxidation reactions and charged by light energy; in particular the purpose of the present invention is to provide a photochargeable air battery having a simple structure in which a photo-electrode formed from a semiconductor and photochemical excitation material is unnecessary.

In order to achieve the above mentioned objectives, in a chargeable battery possessing a positive electrode, negative electrode, electrolyte contacting with these positive and negative electrodes, and a battery case housing the aforementioned positive electrode, negative electrode and electrolyte, a photochargeable air battery can be obtained according to the present invention possessing a light receptor for injecting light into the aforementioned negative electrode which is discharged by the oxidation of the metal material forming the aforementioned negative electrode, and charged by reducing using light energy, the metal material forming the aforementioned negative electrode which is oxidized by the aforementioned discharge.

Additionally, in a chargeable air battery possessing a positive electrode, negative electrode, electrolyte contacting with these positive and negative electrodes, and a battery case housing the aforementioned positive electrode, negative electrode and electrolyte a photochargeable air battery can be obtained according to the present invention possessing a light receptor for injecting light into the aforementioned negative electrode which is discharged by the oxidation of a metal material forming the aforementioned negative electrode, in which light is irradiated onto a photo-electrode formed from a N-type semiconductor communicating electrically with the aforementioned metal material, and which is charged by reducing using the aforementioned light energy, the metal material forming the aforementioned negative electrode which is oxidized by the aforementioned discharge.

BRIEF DESCRIPTION OF THE DRAWINGS

FIG. 8 also shows the electrical charge/discharge behavior of the battery used in the present experiment.

FIG. 9 also shows the electrical discharge behavior under light irradiation of the battery used in the present experiment.

FIG. 10 also shows the electric potential of the positive electrode and negative electrode during charging and discharging of the battery used in the present experiment.

FIG. 18 also shows the electrical charge/discharge behavior of the battery used in the present experiment.

DETAILED DESCRIPTION OF THE PREFERRED EMBODIMENTS

Figure 1:
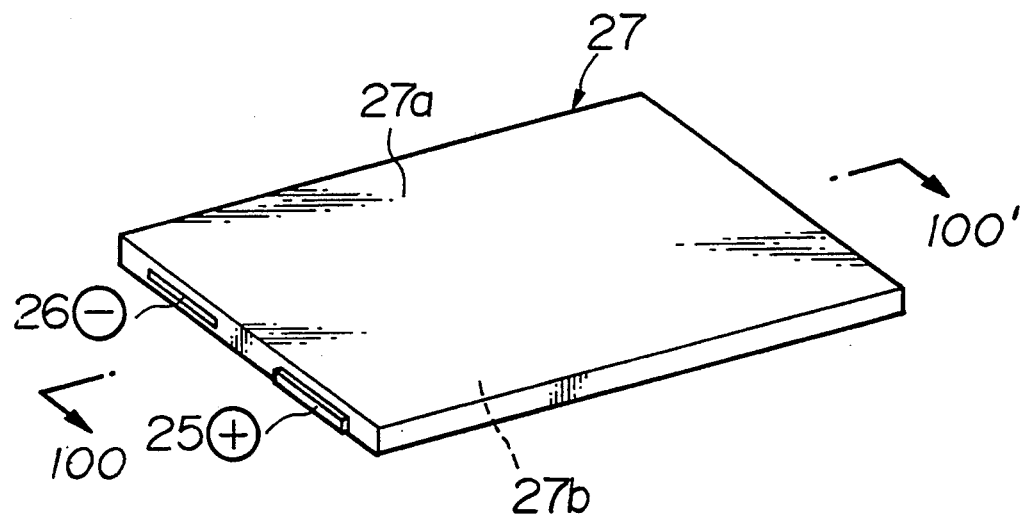
FIG. 1 shows a perspective view of a photochargeable air battery according to a first preferred embodiment of the present invention.
Figure 2:
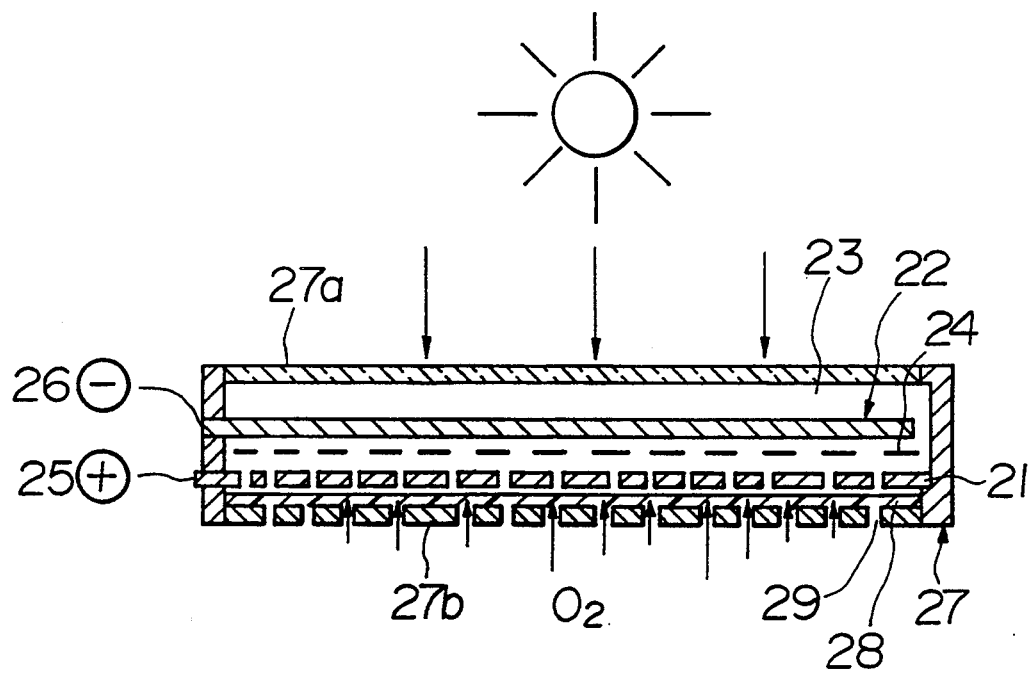
FIG. 2 shows a cross-sectional view along the line 100-100' of the photochargeable air battery according to the first preferred embodiment shown in FIG. 1.

FIGS. 1 and 2 show a first embodiment of the photochargeable air battery according to the present invention. In these Figs., numeral 21 is a positive electrode formed from a porous oxygen catalyst, 22 is a negative electrode formed from a metal material, 23 is an electrolyte contacting with these positive and negative electrodes, 24 is a separator, 25 is a positive electrode terminal, 26 is a negative electrode terminal, 27 is a battery case and 28 is a water-repellent film.

The aforementioned battery case 27 is box-shaped and has a construction possessing on one side a light receptor 27a formed from light transmission material and the like, and a number of air holes 29 are provided on the side opposite this light receptor 27a. This battery case 27 houses positive electrode 21 provided on side 27b wherein air holes 29 are formed; negative electrode 22 provided on the light receptor 27a side; liquid electrolyte 23 filling the space between photoreceptor 27a and negative electrode 22, between the aforementioned positive electrode 21 and negative electrode 22;, and separator 24, provided in between the aforementioned positive electrode 21 and negative electrode 22, which is formed from glass fibers and the like through which electrolyte 23 may pass. However, battery case 27 is not limited to a box-shape, as the shape may be cylindrical as well.

Water-repellent film 28 is provided in between positive electrode 21 and side 27b wherein air holes 29 of battery case 27 are formed, and is constructed to prevent the outward flow of electrolyte 23 to the exterior.

In the photochargeable air battery of the present embodiment, in order for the discharging reactions based on the reduction of oxygen in the air to progress smoothly, it is necessary to effectively construct a gas-liquid-solid three-phase boundary using oxygen, electrolyte 23 and positive electrode 21 (oxygen catalyst). Consequently, with the objective of increasing this aforementioned three-phase boundary, positive electrode 21 is constructed using a porous oxygen catalyst. When constructing a battery that employs low rate (small electric current) discharge, it is not always necessary to have porosity, as it is also possible to use a plate-shaped positive electrode 21.

It is preferred that positive electrode 21 be constructed using a porous oxygen catalyst such as carrying carbon (porous carbon), porous nickel or a combination therein with Pt, Pd or the like (e.g. Pt—C, Pd—C, Pt—Ni, Pd—Ni); a noble metal as well as an alloy of Pt, Pd, Ir, Rh, Os, Ru, Pt—Co, Pt—Au, Pt—Sn, Pd—Au, Ru—Ta, Pt—Pd—Au, Pt-oxide, Au, Ag, Ag—C, Ni—P, Ag—Ni—P, Raney nickel, Ni—Mn, Ni-cobalt oxide, Cu—Ag, Cu—Au, Raney silver and the like; an inorganic compound such as nickel boride, cobalt boride, tungsten carbide, titanium hydroxide, tungsten phosphide, niobium phosphide, carbides of transition metals, spinel compounds, silver oxide, tungsten oxide, and perovskite-type ion crystals of transition metals; or an organic compound such as bacteria, non-ionic activator, phthalocyanine, phthalocyanine metal, activated carbon, and quinone.

Negative electrode 22 is constructed using metals such as Ti, Zn, Fe, Pb, Al, Co, Hf, V, Nb, Ni, Pd, Pt, Cu, Ag, Cd, In, Ge, Sn, Bi, Th, Ta, Cr, Mo, W, Pr, Bi, U, the oxides of which have semiconductivity, or of a metal in which at least a portion is an oxide of an aforementioned metal, and complex elemental metals or alloys of the aforementioned metals.

Further minute amounts of metal oxide, nitride, carbide, hydroxide, or complex compounds therein are formed on the surface of the metal material forming negative electrode 22 by contact of this metal material with oxygen, nitrogen, carbon dioxide in the air or with the electrolyte. It is preferred that this type of compound be incorporated into negative electrode 22 by facilitating photo charging reactions using a product displaying semiconductivity.

Additionally, as the electrolyte 23 of the present embodiment liquid electrolytes formed from bases such as potassium hydroxide, sodium hydroxide and ammonium chloride, and their weak acids may be used. As well, although the charging ability is lowered, strong acids such as sulfuric acid and hydrochloric acid and their salts may also be used.

Furthermore, in the present embodiment, as mentioned above, liquid electrolytes are used, however electrolyte 23 is not limited to a liquid, as electrolytes in a solid state or paste form which do not hinder electron transfer through this electrolyte between positive electrode 21 and negative electrode 22, may also be used.

As separator 24, materials which have durability in regards to the electrolyte such as glass fiber and polyamide fiber nonwoven fabric, polyolefin-type fiber nonwoven fabric, cellulose and synthetic resins may be used, however separator 24 is not in particular limited to these materials.

As battery case 27, materials which do not erode electrolyte 23 such as ABS resin and fluorocarbon polymer may be used, however battery 27 is not limited to the aforementioned. The light receptor 27a portion located on the negative electrode side of battery case 27 may be constructed using (colorless or colored) material which transmits at least a portion of visible and UV light spectrums such as transparent plates and transparent films formed from glass, quartz glass, acrylic, styrene and the like. It is also possible to construct the entire battery case 27 using such materials as these transparent plates and films.

The light receptor 27a portion is constructed so as to transmit at least a portion of visible and UV light spectrums in order to facilitate the photocharging reaction which prevents extreme lowering of the irradiated light energy reaching the surface of negative electrode 22, since at the time of irradiating light onto the surface of negative electrode 22, the irradiated light is absorbed or reflected by battery case 27.

In order to smoothly facilitate discharging reaction based on reduction of oxygen in the air, the oxygen in the air must be diffused onto the surface of positive electrode 21 formed from the oxygen catalyst. In order to achieve this diffusion, the battery of the present embodiment has a structure in which at least one small-diameter air hole 29 is provided on the positive electrode 21 side of battery case 27. As long as the diameter of air hole 29 is sufficient to allow passage of air, air hole 29 may be in the form of a large diameter aperature or an open portion.

Water-repellent film 28 is provided between positive electrode 21 and side 27b of the aforementioned positive electrode 21 of battery case 27. This water-repellent film 28 in addition to preventing permeation and outward flow of electrolyte 23 passing through the holes of positive electrode 21 to the exterior portion of the photochargeable air battery, also serves to increase the three-phase boundary of formed by oxygen, electrolyte 23 and positive electrode 21.

It is preferred that water-repellent film (water-repellent plate) 28 be formed using fluorocarbon resins such as porous tetrafluoroethylene, silicone resins and the like.

Further, it is possible to construct the photochargeable air battery of the present embodiment using a water-repellent plate in place of the aforementioned water-repellent film 28. Similarly, instead of providing a water-repellent film or water-repellent plate, it is also possible to construct positive electrode 21 from an oxygen catalyst and water-repellent agent by mixing the water-repellent agent into the oxygen catalyst, since the positive electrode catalyst 21 formed from this oxygen catalyst and water-repellent agent serves the same function as water-repellent film 28 (water-repellent plate). In this case, the aforementioned three-phase boundary results in an even greater increase.

In addition, when forming small air holes 29, in order to uniformly diffuse the oxygen taken in by the air holes over the entire surface of positive electrode 21, it is possible to provide diffusion paper formed from cellulose and the like between the positive electrode 21 side 27a of battery case 27, and either water-repellent film 28 or a positive electrode 21 incorporating a water-repellent agent.

Figure 3:
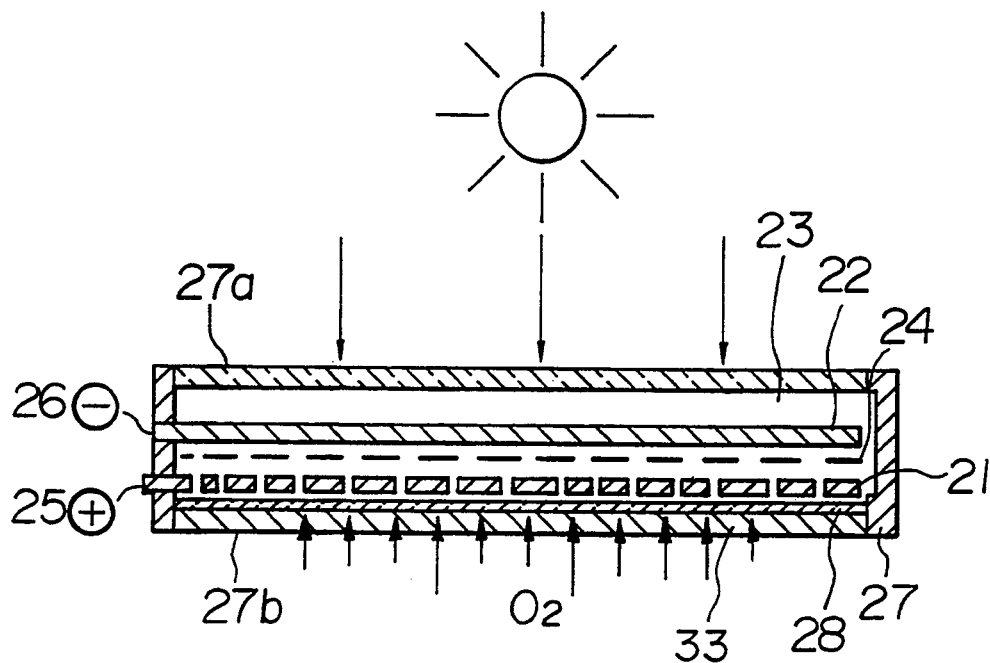
FIG. 3 shows a cross-sectional view of a photochargeable air battery according to a second preferred embodiment of the present invention.

FIG. 3 describes a second preferred embodiment of the present invention, in which the positive electrode 21 side 27a portion of battery case 27 is constructed using oxygen permeable material 33. The remaining structure of this second preferred embodiment is the same as that of the first preferred embodiment.

The aforementioned positive electrode 21 side 27a portion of battery case 27 is constructed using oxygen permeable material 33 in order to diffuse the oxygen in the exterior of the battery over the surface of positive electrode 21 formed from the oxygen catalyst, in the same manner that air holes 29 were formed in battery case. 27 of the first preferred embodiment.

It is preferred that oxygen permeable material 33 be formed from materials such as ethyl cellulose, cellulose, acetate and butylate. However, construction is not limited to using just these materials as any material permeable to oxygen may be employed.

In the photochargeable air battery of the first preferred embodiment, air holes 29 are constructed in battery case 27 in order to take in air into the battery case, while in the photochargeable air battery of the second preferred embodiment a portion of battery case 27 is constructed using oxygen permeable material. However, it is also possible, without using the above construction, to facilitate the discharging reaction utilizing only the oxygen existing inside battery case 27 and the oxygen created by the charging. Consequently, a construction in which air holes 29 are provided in battery case 27 (side 27b) or in which side 27b portion is formed by material permeable to oxygen is not required. However, in these cases, the discharge capacity of the battery, namely the energy density is low compared to the aforementioned embodiment, since intake of oxygen from the exterior is not possible.

In the following, a simplified summary will be given outlining the action of the photochargeable air battery of the first and second embodiments during charging and discharging. During discharging, the metal material forming negative electrode 22 and the hydroxide ions in electrolyte 23 react on negative electrode 22, producing in the end, metal oxide and water as well as supplying electrons via negative electrode terminal 26 to the load.

On the other hand, at the positive electrode, at the three-phase boundary formed by oxygen taken in from the air, electrolyte 23 and the oxygen catalyst (positive electrode) 21, oxygen, water in electrolyte 23, and electrons supplied (discharged) from the negative electrode via the load, react to produce hydroxide ions. In this discharging reaction, decrease of electrolyte 23 does not occur because of the resultant cancellation of the reactions occurring in the entire battery, at positive electrode 21 and negative electrode 22. Additionally, there is no problem with consumption of the oxygen, the positive electrode active material, because oxygen is taken in from the air via side 27b of battery case 27. As a result, the metal material forming negative electrode 22 is transformed by means of the present discharging reaction, and by means of this discharging reaction, metal oxide is produced. Consequently, charging of the photochargeable air battery of the present embodiment is nothing more than reducing the aforementioned metal oxide.

Generally, in order to achieve photocharging, in addition to positive electrode 21 and negative electrode 22, a photo-electrode for performing light reactions is necessary. However, the photochargeable air battery of the present embodiment is able to perform light reactions even though a photo-electrode is not present in its structure. The reason for this will be explained in the following.

In the present embodiment, the metal oxide formed on the surface of negative electrode 22 by means of the aforementioned discharging reactions, functions as a photo-electrode, resulting in the facilitation of photocharging reactions even though a photo-electrode is not present. Namely the metal oxide is a discharge product displaying semiconductivity. In addition, the energy band of the aforementioned discharge product, at the contact surface of electrolyte 23 and the discharge product, bends upward towards electrolyte 23. When light energy from the sun, fluorescent lamps and the like irradiates onto the surface of this discharge product, electrons are excited to the conduction band and a hole is created in the valence electron band. This hole which accompanies the aforementioned bending of the energy band, is transferred towards electrolyte 23 and reacts with hydroxide ions on the surface of negative electrode 22.

These electrons which are excited to the conduction band accompany the bending of the band, and move towards metal on negative electrode 22 which has not been oxidized yet, eventually reaching the metal-metal oxide-electrolyte boundary. At this boundary, the aforementioned electrons react with water in electrolyte 23 producing hydroxide ions in addition to reducing the discharge product of metal oxide as further reduction of the metal part of the end reaction is not possible. Through the above-described process, the photocharging reaction is facilitated.

Furthermore, the photochargeable air battery of the present invention is not limited to simply photocharging as electrical charging is also possible when necessary.

In the above described manner, through the structure described in the first and second preferred embodiments, a high energy density photochargeable air battery is provided in which charging can be performed using oxygen in the air as an energy source, not observed in prior art photochargeable batteries, as well as light energy, and which possesses superior energy-saving capabilities such that a battery charger is not necessary. In particular, a photochargeable air battery is achieved using a simple structure formed from a 2-electrode system in which a photo-electrode formed from a semiconductor or photochemical excitation material is not present. Additionally, a photochargeable air battery is provided in which charging is possible using both electrical and light energy forms, which facilitates photocharging reactions even during discharge.

Figure 4:
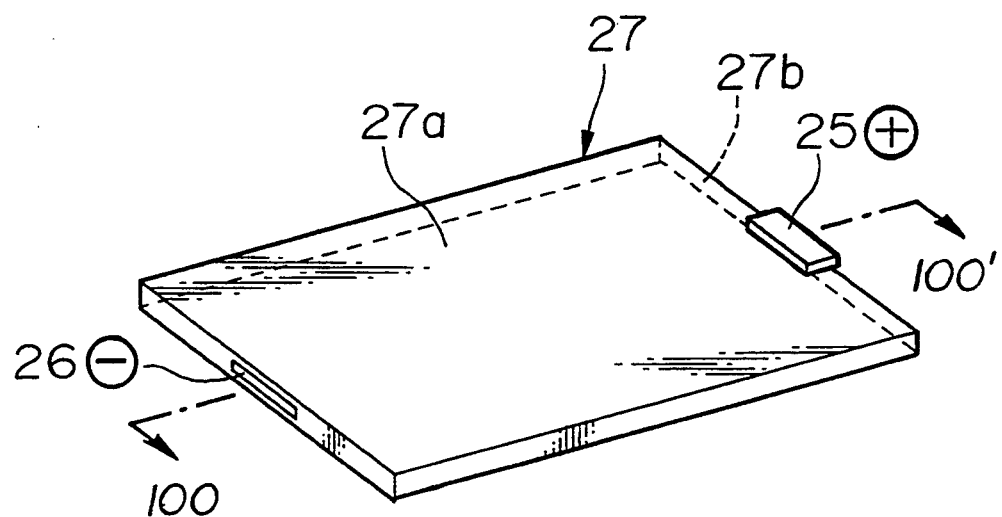
FIG. 4 shows a perspective view of a photochargeable air battery according to a third preferred embodiment of the present invention.
Figure 5:
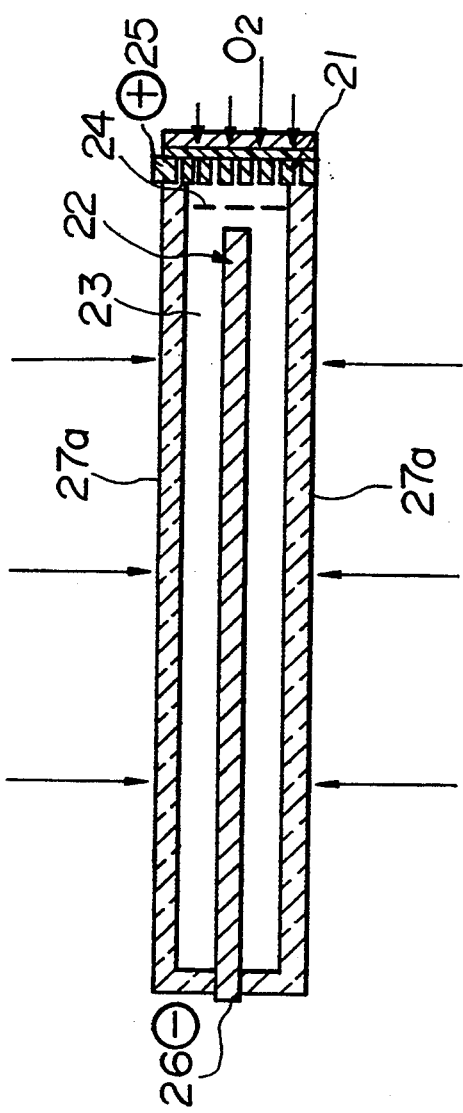
FIG. 5 shows a cross-sectional view along the line 100-100' of the photochargeable air battery according to the third preferred embodiment shown in FIG. 4

The third preferred embodiment of the present invention is shown in FIGS. 4 and 5. As shown in FIGS. 4 and 5, in the present embodiment, positive electrode 21 and negative electrode 22 are not arranged to face each other in a horizontally stacked direction, but rather positive electrode 21 is disposed in a position facing the terminal face of negative electrode 22 on the side face of photochargeable air battery; additionally, photoreceptor 27a portion is arranged on both sides of the photochargeable air battery. As a result, light is irradiated onto both sides of negative electrode 22, and since the discharge product formed on both sides of negative electrode 22 is reduced by light energy, a large quantity of discharge product can be both reduced and produced, thereby enabling improvement of both the charging and discharging capabilities of the photochargeable air battery. In other words, by means of the present embodiment the photocharging time can be reduced and the battery capacity can be increased.

Figure 6:
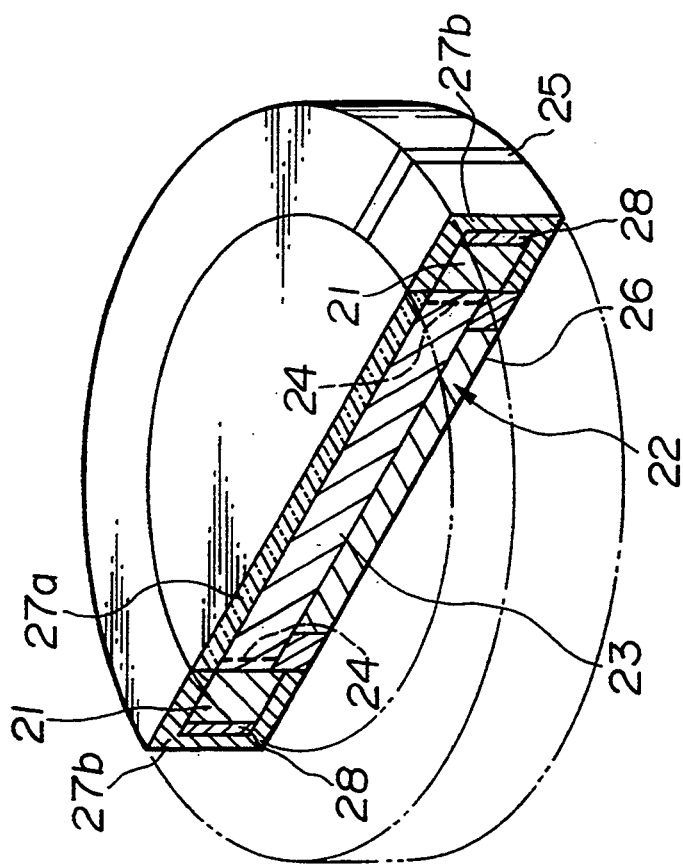
FIG. 6 shows a cross-sectional view of a photochargeable air battery according to a fourth preferred embodiment of the present invention.

The fourth preferred embodiment of the present invention is shown in FIG. 6. As shown in FIG. 6, positive electrode 21 is arranged on the perimeter of the side face of the photochargeable air battery. As a result, oxygen can be taken in from the perimeter of photochargeable air battery, and the high raze (large electric current) discharging capability can be improved. Furthermore, in the present embodiment, a structure can be achieved in which photoreceptor portions 27a are arranged on both sides of the battery by means of placing negative electrode terminal 26 on the side face of the battery, isolated from positive electrode terminal 25.

Figure 7:
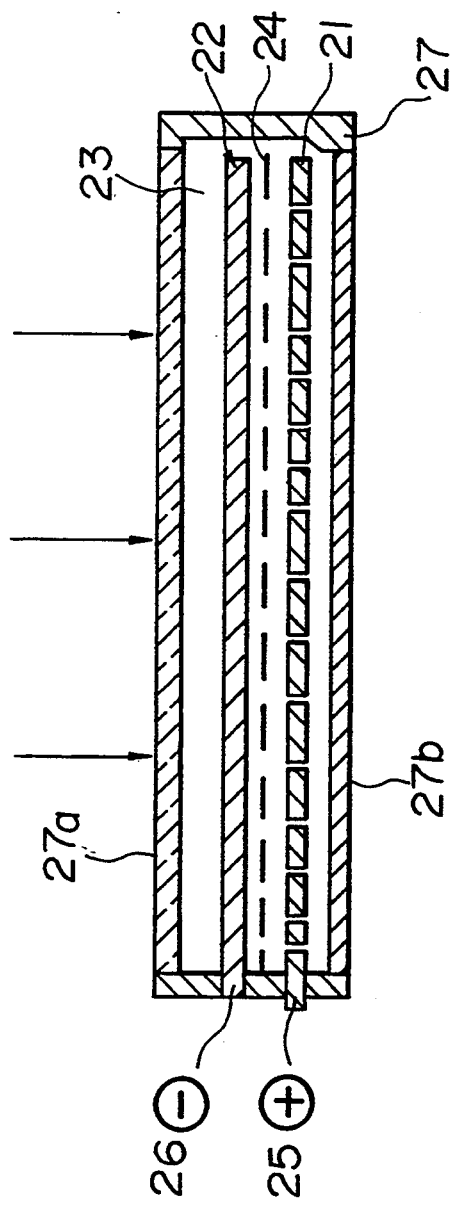
FIG. 7 shows a cross-sectional view of a photochargeable air battery according to a fifth preferred embodiment of the present invention.

The fifth preferred embodiment of the present invention is show in FIG. 7. In this embodiment, a metal material such as nickel is used as the positive electrode 21 in place of the oxygen catalyst. The discharging reaction of this type of photochargeable air battery is facilitated by means of redox reactions of electrolyte 23 or redox reactions of negative electrode 22, rather than by intake of oxygen as the active material. As a result, although the energy density of the battery is lowered, facilitation of reduction of the discharge product as well as charging of the photochargeable air battery is performed, as in the aforementioned embodiments 1 through 4, by applying light energy to discharge products near the negative electrode. Positive electrode 21 may be any material possessing semiconductivity such as various types of metals and graphites (carbon) which display a higher (noble) potential than that of negative electrode material 22 in electrolyte 23. Negative electrode 22 and electrolyte 23 may be constructed using the same materials as in the aforementioned first and second embodiments. In addition, in electrolyte 23, the redox capabilities of the electrolyte can be improved by using an aqueous solution incorporating redox ions such as $[Fe(CN)_6]^{3-}/[Fe(CN)_6]^{4-}$ and $I_2/I^-$, $Fe^{3+}/Fe^{2+}$.

(Experiment 1)

A $Ti|KOH|Pt(O_2)$-type photochargeable air battery employing Pt and Ti, in the positive electrode and negative electrode respectively with 1 mole per liter KOH in the electrolyte, was tested in accordance with the first preferred embodiment. It was confirmed that this photochargeable air battery possessed photocharging capability and the ability to be discharged using oxygen in air.

Figure 8:
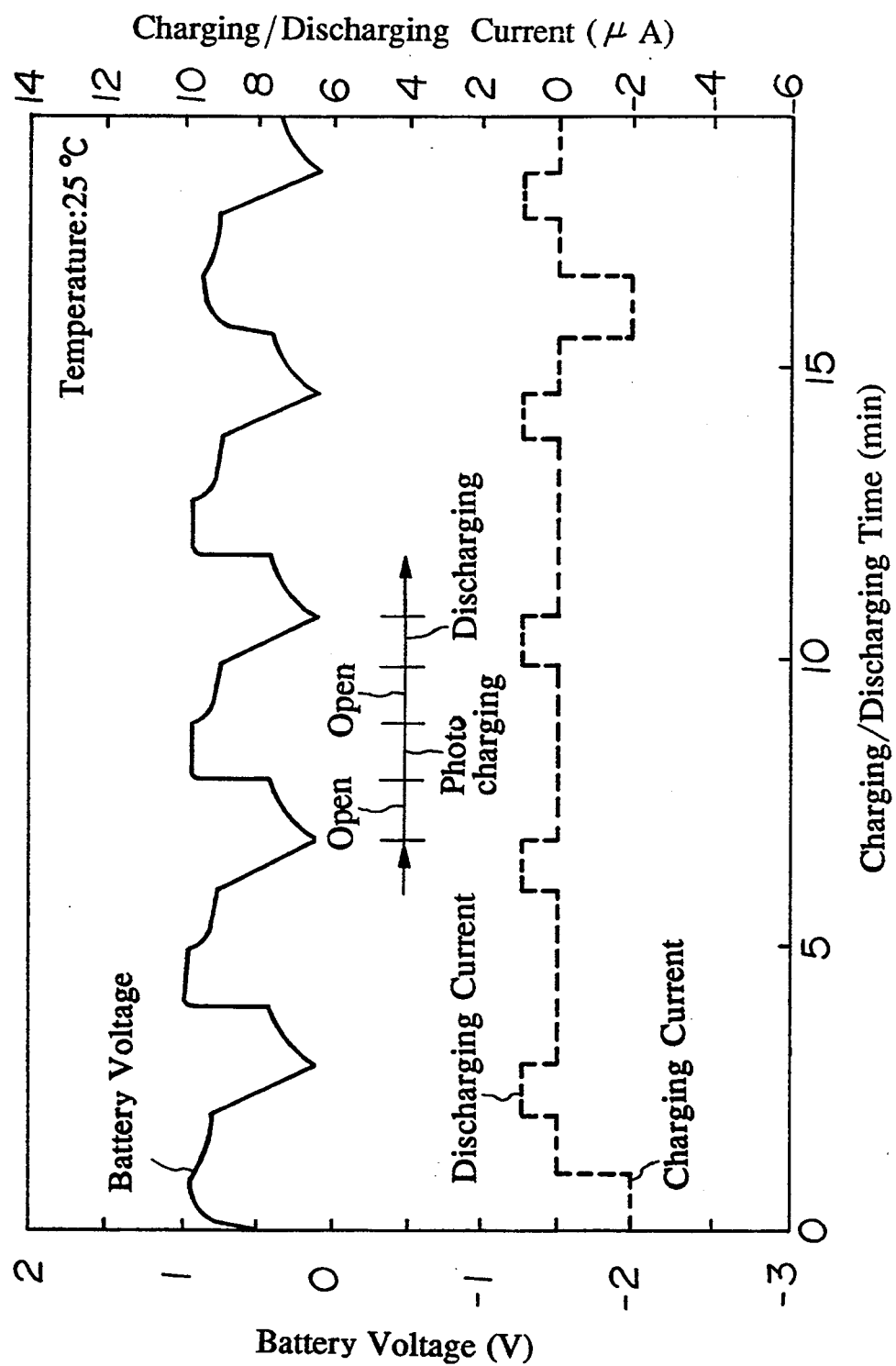
FIG. 8 is a graph showing the measured results of the battery voltage and charging and discharging electrical currents according to a $Ti|KOH|Pt(O_2)$-type photochargeable air battery used in experiment 1 of the present invention.

The measured results of the charging and discharging behavior of the aforementioned $Ti/O_2$-type photochargeable air battery as tested are shown in FIG. 8. In the figure, the change in voltage over time corresponds to each measured state, charging→open→discharging-→open, and the measurements for this series, repeated 5 times, are shown. Furthermore, the sudden increases in the battery voltage to approximately 1 V represent the process of voltage recovery by means of charging: the first and fifth cycles represent electrical charging, while the second through fourth cycles were performed by photocharging. As a result, by means of the light irradiated onto the surface of activity of the negative electrode following charging, recovery of the battery voltage was observed, and the ability to repeatedly charge and discharge was confirmed.

In addition, the battery of the present experiment can be charged using both light and electrical energy, and differences in the discharge capacity due to differences in the charging processes were not observed. Furthermore, the battery of the present invention displayed a superior longevity, as reduction of the discharging capacity was not observed even after repeating photocharging and discharging over 50 times.

Figure 9:
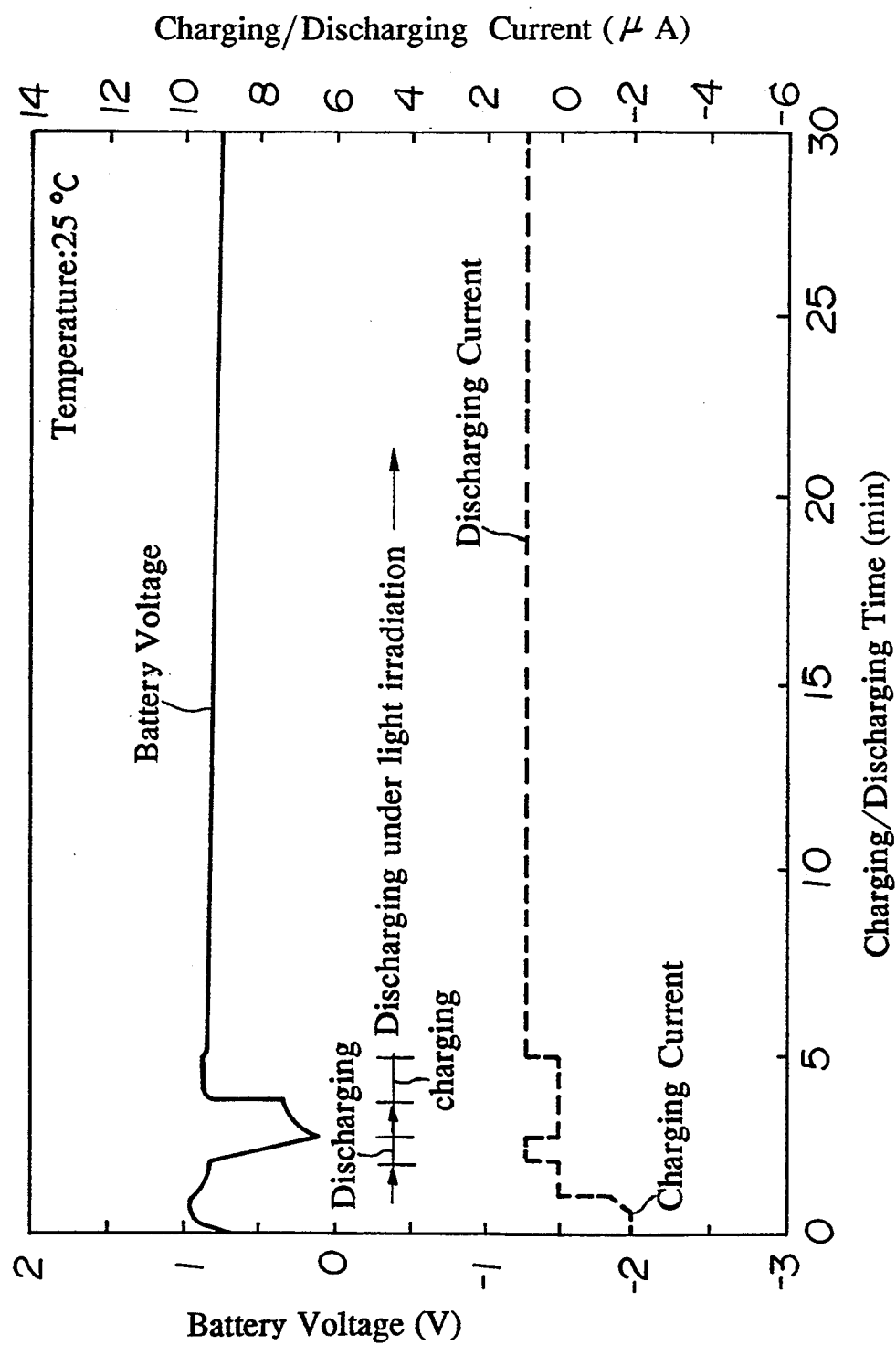
FIG. 9 is a graph showing the measured results of the battery voltage and charging and discharging electrical currents according to a $Ti|KOH|Pt(O_5)$-type photochargeable air battery used in experiment 1 of the present invention.
Figure 10:
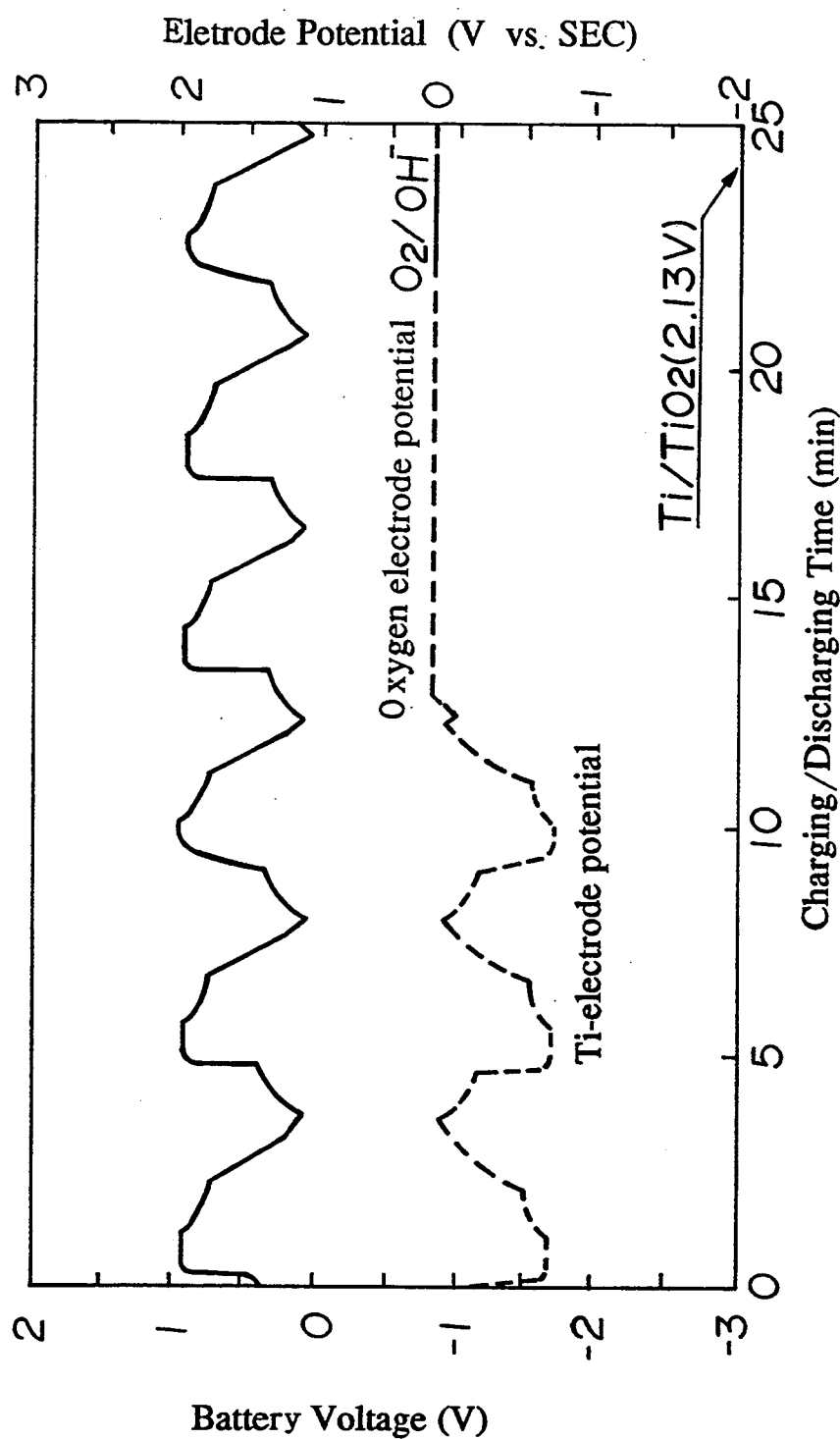
FIG. 10 is a graph showing the measured results of the battery voltage and electrode electric potential according to a $Ti|KOH|Pt(O_2)$-type photochargeable air battery used in experiment 1 of the present invention.

In order to ascertain the effects of irradiated light in regards to the battery characteristics during discharging, the discharging behavior was measured, the results of which are shown in FIG. 9. In this experiment, lowering of the battery voltage accompanying discharge was rarely observed, and even during discharging, facilitation of photocharging reaction was confirmed. In regards to the cell reaction, as shown in FIG. 10, the reaction potential of positive electrode 21 is consistent with the redox potential of oxygen/hydroxide ions ($O_2$./$OH^-$), thus progress of the oxygen intake reaction at positive electrode 21 was confirmed.

Additionally, during charging and discharging, the negative electrode potential regulates change in the battery voltage, and from this, it was demonstrated that matter conversion of the discharge product, in other words, progress of the photoreduction at negative electrode 22 occurred. The battery tested in the present experiment possessed a diameter of 10 mm, and a thickness of 5 mm as its dimensions, and a xenon lamp was used as the light source in taking the measurements of the aforementioned charging and discharging movement. In addition, the battery tested and measured in the present invention was used only to confirm the existence of photocharging and discharging functions and the aforementioned discharge capacity increased over a wide range in accordance with the porosity of negative electrode 22 and as well the most appropriate design.

Figure 11A:
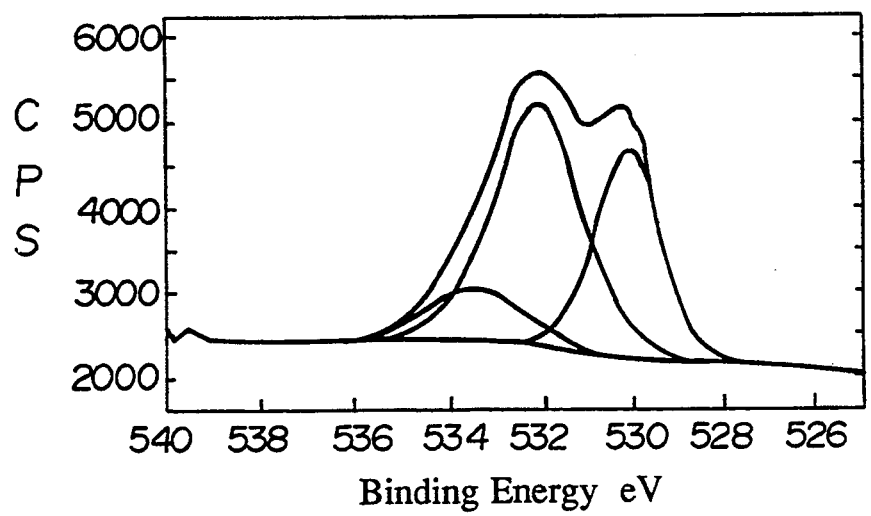
FIGS. 11 (A) and (B) are graphs showing the measured results of oxidation states of the Ti-electrode in the photochargeable air battery of FIG. 8: 11(A) shows the oxidation states of the naturally oxidized Ti-electrode, and 11(B) shows the oxidation states of the electrochemically reduced Ti-electrode.
Figure 11B:
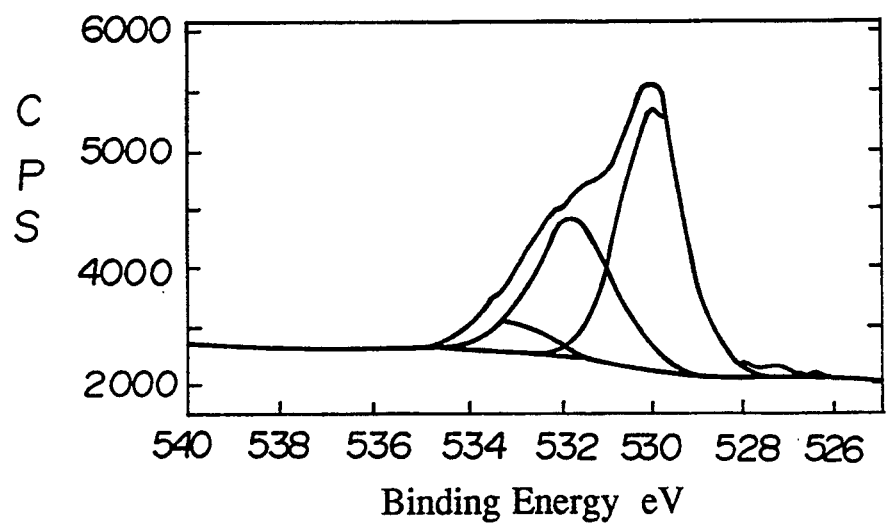
Figure 12A:
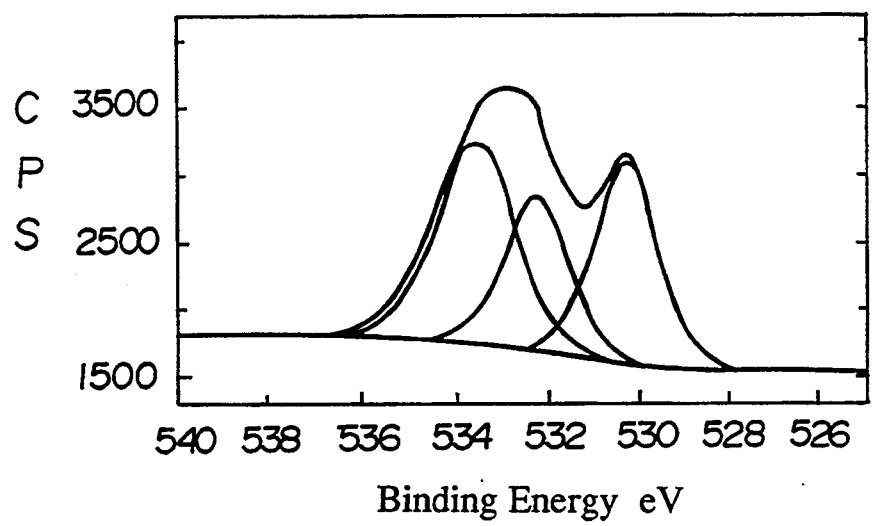
FIGS. 12 (A), (B) and (C) are graphs showing the measured results of oxidation states of the Ti-electrode accompanying charging and discharging of the photochargeable air battery of FIG. 8: 12(A) shows the oxidation states of the discharged Ti-electrode; 12(B) shows the oxidation states of the electrically charged Ti-electrode; and 12(C) shows the oxidation states of the photocharged Ti-electrode.
Figure 12B:
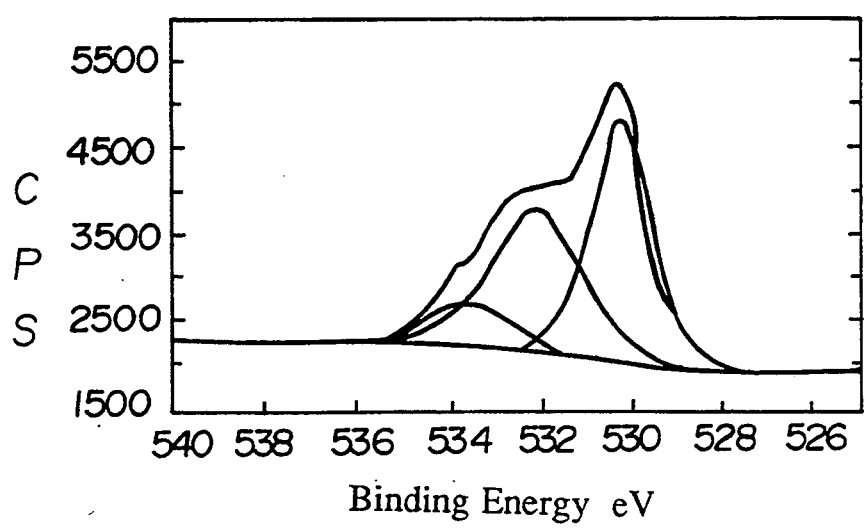
Figure 12:
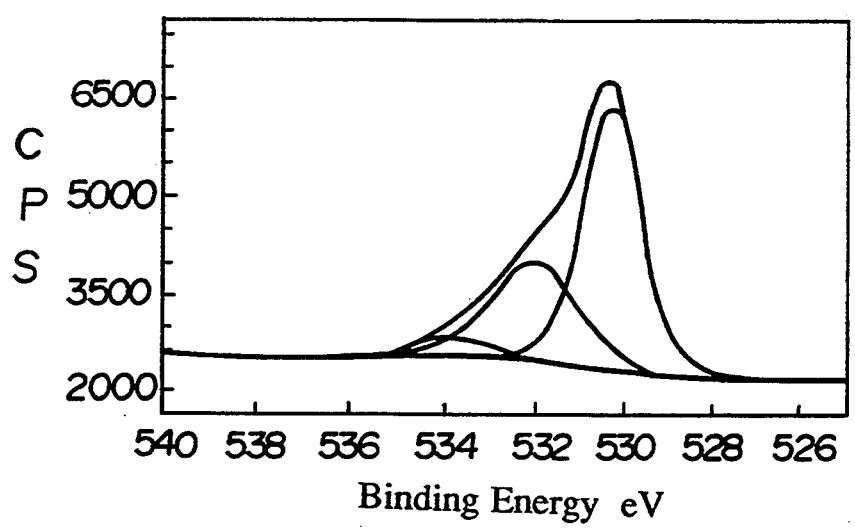

The change in oxidation states on the surface of a Ti electrode, which accompany photocharging and discharging of this type of photochargeable air battery are shown in FIGS. 11 and 12.

In regard to the Ti electrode used in the $Ti|KOH|Pt(O_2)$-type photochargeable air battery as the negative electrode material in the aforementioned experiment, FIGS. 11 and 12 show the relationship between the bonding energy (horizontal axis) of the 1s orbital electron of oxygen (O1S) and the photoelectron strength (vertical axis) for each sample resulting from examination of the electron sample surface oxidation states, by XPS (X-ray photo-electron spectroscopy) scattering, in 5 different kinds of redox and charging/discharging states. FIG. 11(A) shows the relationship between the bonding energy of the 1s orbital electron of oxygen and the photoelectron strength measured by XPS scattering for naturally oxidized Ti metal in the atmosphere before manufacture of the battery; FIG. 11(B) is a graph showing the same relationship for a Ti electrode surface following electrochemical reduction in 1 mol/l of KOH aqueous solution.

Additionally, FIG. 12(A) shows the relationship between the bonding energy of the 1s orbital electron of oxygen and the photoelectron strength as measured by XPS scattering for a Ti electrode following discharging; FIG. 12(B) shows the same relationship for a Ti electrode following electrical charging; and FIG. 12(C) shows this same relationship for a Ti electrode surface following light irradiation (charging) in the aforementioned experiment. Furthermore, in both FIGS. 11 and 12, the vertical axis scale displaying the photoelectron strength shows different values in accordance with each sample.

Figure 13:
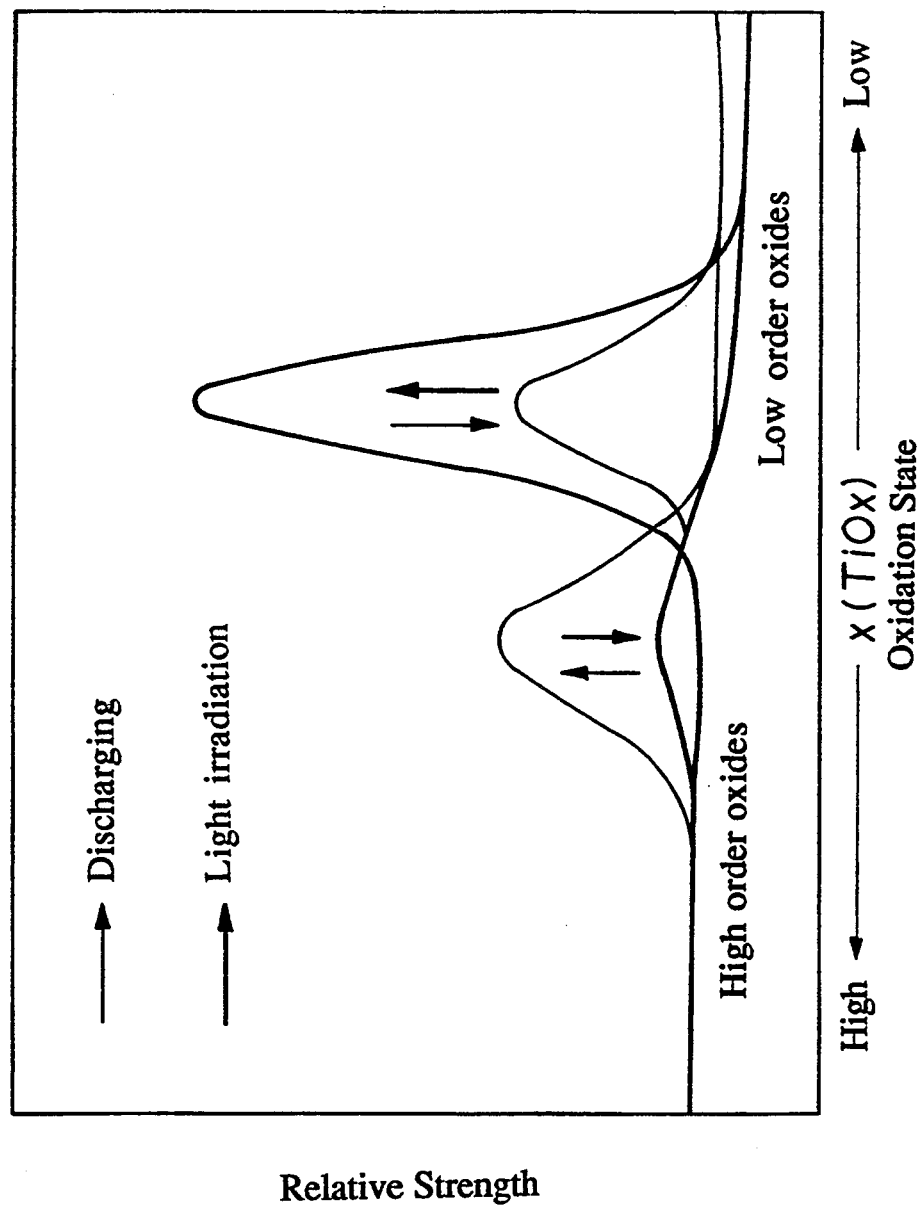
FIG. 13 is a graph showing the rise and fall fluctuations of the Ti oxide accompanying photocharging and discharging of the photochargeable air battery of FIG. 8.

In addition, the greater the bond energy value (the degree of shifting to the left in the figure), the higher oxidation state (the larger O/Ti molecular ratio) of the aforementioned Ti metal. FIG. 13 is a graph summarizing the aforementioned measured results; this graph clearly shows the change in oxidation state of the Ti electrode surface accompanying discharging/photocharging (discharging and light irradiation) of the battery of the present experiment.

Furthermore, the photoelectron peaks having intermediate bond energy values seen in FIGS. 11 and 12 correspond to the oxide produced by reaction with the atmosphere following the battery charging/discharging experiment up until the start of the scattering experiment. The atmospheric oxidation products of Ti reduced to metal by light irradiation are also included; however, because these products are difficult to separate from the initially-existing oxide, these photoelectron peaks having intermediate bond energy values have been excluded from FIG. 13.

As seen from the aforementioned measured results, the higher order oxides with large O/Ti molecular ratio produced by discharging are reduced to lower order oxides and metals with a small O/Ti molecular ratio by means of light irradiated onto these aforementioned higher order oxides, namely, by means of the photoreaction of the discharge product themselves, and the photochargeable air battery is thus photocharged. In other words, functioning of the battery of the present invention as a photochargeable air battery adds to the overall function of the battery, and this was also supported by the level of matter conversion as interpreted from the aforementioned experiment.

In the following, the sixth through ninth embodiments of the photochargeable air battery according to the present invention will be explained with reference to FIGS. 14 through 17.

Figure 14:
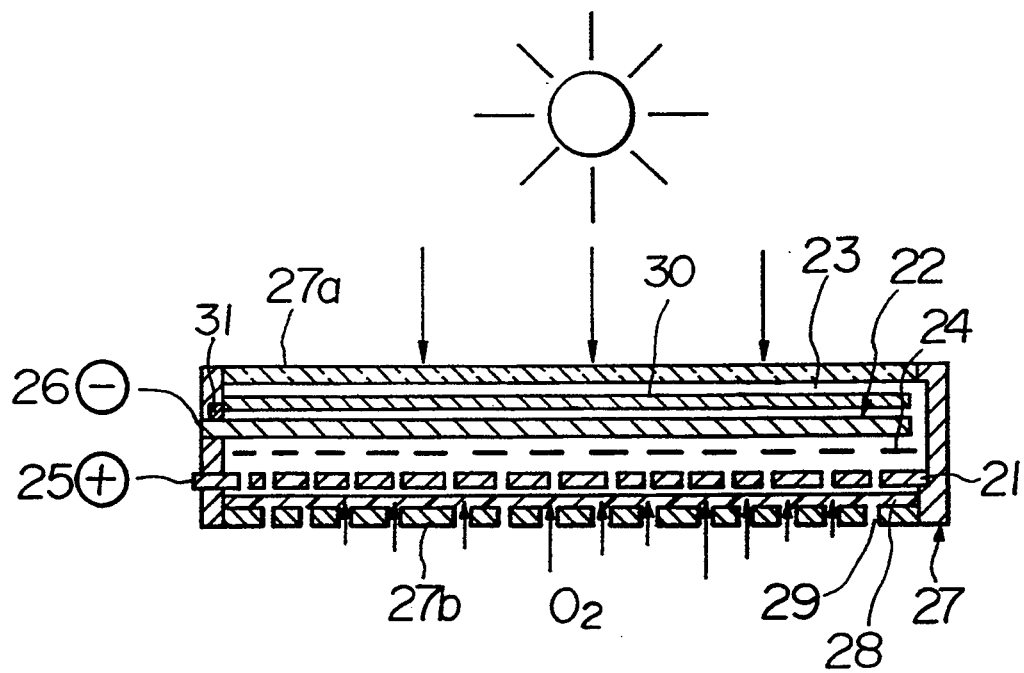
FIG. 14 shows a cross-sectional view of a sixth preferred embodiment shown in FIG. 1.

FIG. 14 shows a sixth preferred embodiment of the present invention. As shown in FIG. 14, numeral 21 is a positive electrode formed from a porous oxygen catalyst, 22 is a negative electrode, 24 is a separator, 25 is a positive electrode terminal, 26 is a negative electrode terminal, 27 is a battery case, 28 is a water-repellent film, 30 is photo-electrode formed from an N-type semiconductor, and 23 is an electrolyte contacting with the aforementioned positive electrode 21, negative electrode 22, and photo-electrode 30. This photo-electrode 30 is electrically communicated to a plate shaped metal material 22a forming negative electrode 22, by means of communicating member 31.

Battery case 27 is box-shaped and has a construction possessing on one side a light receptor 27a formed from light transmitting material and the like, and a number of air holes 29 provided on the side opposite this light receptor 27a. This battery case 27 houses positive electrode 21 provided on side 27b wherein air holes 29 are formed, negative electrode 22 provided on the light receptor 27a side, liquid electrolyte 23 filling the space between positive electrode 21, negative electrode 22, and photo-electrode 30, and separator 24 provided in between the aforementioned positive electrode 21 and negative electrode 22, through which electrolyte 23 may pass. At negative electrode 22, photo-electrode 30 is arranged on the light receptor 27a side, and in between this photo-electrode 30 and positive electrode 21, metal material 22a is provided.

Water-repellent film 28, provided in between positive electrode 21 and side 27b of battery case 27 wherein air holes 29 are formed, is permeable to gas and is constructed to prevent the outward flow of electrolyte 23 to the exterior.

In the photochargeable air battery of the present embodiment, in order for the discharging reactions based on the reduction of oxygen in air to progress smoothly, it is necessary to effectively construct a gas-liquid-solid three-phase boundary using oxygen, electrolyte 23, and positive electrode 21 (oxygen catalyst). Consequently, in order to increase this aforementioned three-phase boundary, positive electrode 21 is constructed using a porous oxygen catalyst. When constructing a battery which employs low rate (small electric current) discharge, it is not always necessary to have porosity, as it is also possible to use a plate-shaped positive electrode.

Positive electrode 21 is constructed in the same manner as in the first and second preferred embodiments. In addition, it is preferred that metal material 22a to form negative electrode 22 be constructed using metals such as Ti, Zn, Fe, Pb, Al, Co, Hf, V, Nb, Ni, Pd, Pt, Cu, Ag, Cd, In, Ge, Sn, Bi, Th, Ta, Cr, Mo, W, Pr, and U, or metals therein in which at least one portion is an oxide of an aforementioned metal, as well as composite component metals and alloys therein.

In addition, it is preferred that photo-electrode 30 be constructed from an N-type semiconductor of compound semiconductors such as Gap, GaAs, AlAs, ZnS, AlSb, InP, CdS, GaSb, InAs, ZnTe, SiC, $BaTiO_3$, $TiO_2$, ZnO, $Ag_2S$, $Ag_2Se$, $Ag_2Te$, $SnO_2$, $ThO_2$, $V_2O_5$, $Nb_2O_5$, $Ta_2O_5$, $Bi_2S_3$, $MoO_3$, $WO_3$, $Na_xWO_3$, $Li_xWO_3$, $K_xO_3$ (in which all X=0-1), $MnO_2$, $FeS_2$, HgSe, $Bi_2Se_3$, $PbCrO_4$, $PbO_x$ (X=0-2), MgO, $Mg_2AlO_4$, $Al_2O_3$, $SiO_2$, $V_2O_4$, FeO, $Fe_2O_3$, $Fe_3O_4$, CuO, $Cu_2S$, CuS, $CuInSe_2$, CuBr, CuI, ZnSe, ZnTe, GeSe, SrO, $ZrO_2$, $Nb_2O_5$, $Nb_2O_3$, $MoO_3$, MoS, AgI, CdO, InSe, SnSe, $Sb_2O_4$, BaO, $Ta_2O_3$, $Ta_2O_5$, $WO_3$, HgTe, $Tl_2S$, $Bi_2S_3$, $Bi_2Se_3$, PbTe, $CeO_2$, $Nd_2O_3$ and the like; inorganic semiconductors such as Si, Ge, Se and the like; condensed polynuclear aromatic compounds such as anthracene, tetracene, pentacene, pyrene, perylene, anthralene, ovalene, coronene, violanthrene, isoviolanthrene, phthalocyanine, copper phthalocyanine, graphite and the like; high polymers such as polyacetylene, polyaniline, polyparaphenylene, polythiophene, polypyrrole and the like; and strong conductors such as $PbZr_xTi_{1-x}O_3$, $Pb_{1-x}M_{2x}NbO_6$ (x=0-1, M=alkali metal) and the like.

The combination of metal material 22a which forms negative electrode 22 and photo-electrode 30, in which there is reciprocal electrical communication is not in particular limited to any type of material, as long as the construction forms the potential level of photo-electrode 30 conduction band lower end, at the contact surface of the aforementioned photo-electrode 30 and electrolyte 23, at a lower potential than the redox potential of the negative electrode active material.

Figure 15:
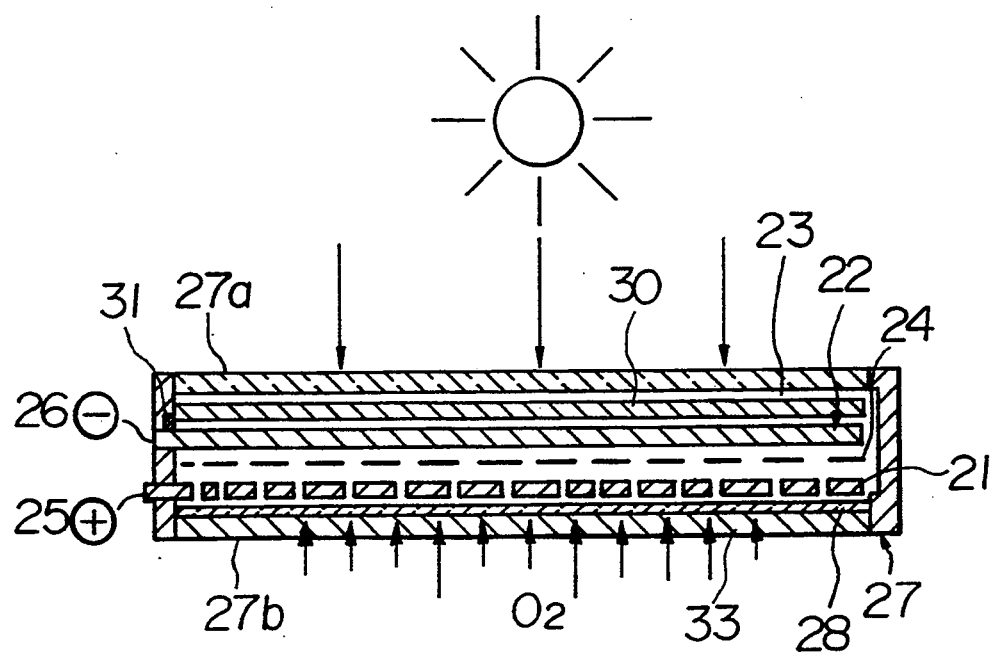
FIG. 15 shows a cross-sectional view of a photochargeable air battery according to a seventh preferred embodiment of the present invention.

FIG. 15 shows a seventh preferred embodiment of the present invention. This seventh preferred embodiment has a construction in which side 27b on the positive electrode 21 side of battery case 27 is formed using oxygen-permeable material 33; the remaining construction is the same as in the first preferred embodiment.

The side 27b portion on the positive electrode 21 side of battery case 27 has been constructed using oxygen permeable material 33 in order to diffuse the oxygen in the exterior of the battery over the surface of positive electrode 21 formed from the oxygen catalyst, in the same manner as air holes 29 were formed in battery case 27 of the first preferred embodiment.

As explained above, by means of the construction shown in the sixth and seventh preferred embodiments, discharging is performed by oxidation of the metal material 22a forming negative electrode 22, and charging is carried out by converting light energy to electrochemical energy using the bending of the energy band produced by submerging photo-electrode 30, formed from an N-type semiconductor, in electrolyte 23. As a result, discharging is performed by oxidation of metal material 22a forming negative electrode 22 using oxygen, while charging is performed by means of the photoelectrochemical action of photo-electrode 30 which is in contact with electrolyte 23.

Figure 16:
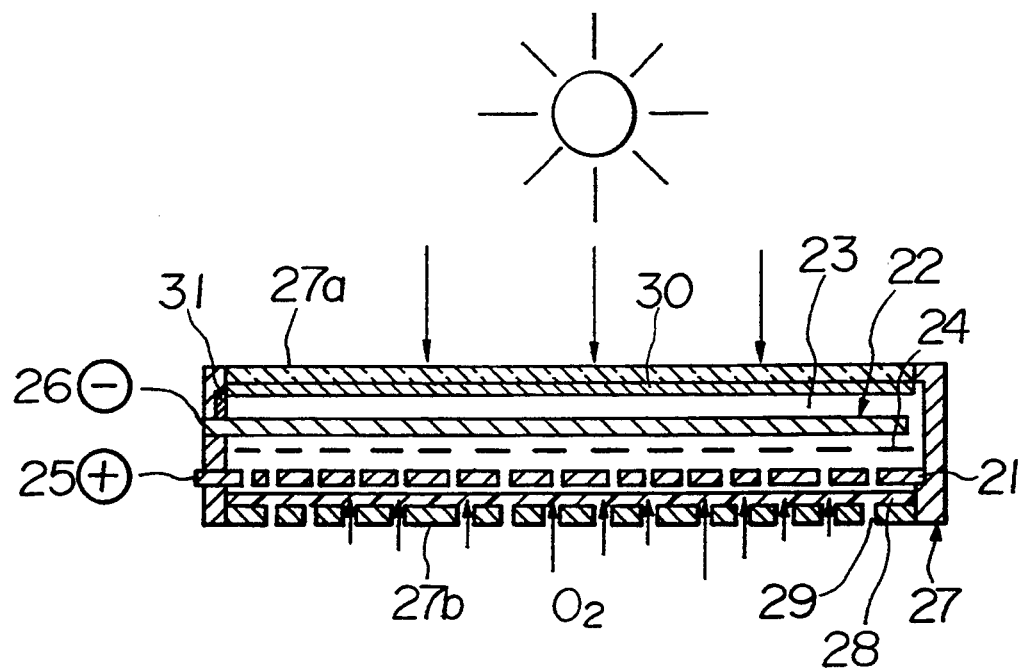
FIG. 16 shows a cross-sectional view of a photochargeable air battery according to an eighth preferred embodiment of the present invention.

FIG. 16 shows the eight preferred embodiment. In this eighth preferred embodiment, a construction is provided in which there is no electrolyte 23 between the photo-electrode 30 side of the battery case and light receptor 27a of battery case 27, thus, in this construction, the photo-electrode 30 side of the battery case does not directly contact electrolyte 23. The remaining construction is the same as in the sixth preferred embodiment. Namely, the photo-electrode 30 side of battery case and the aforementioned battery case light receptor 27a are in contact. Furthermore, it is also possible to use the construction described in the aforementioned seventh preferred embodiment.

Figure 17:
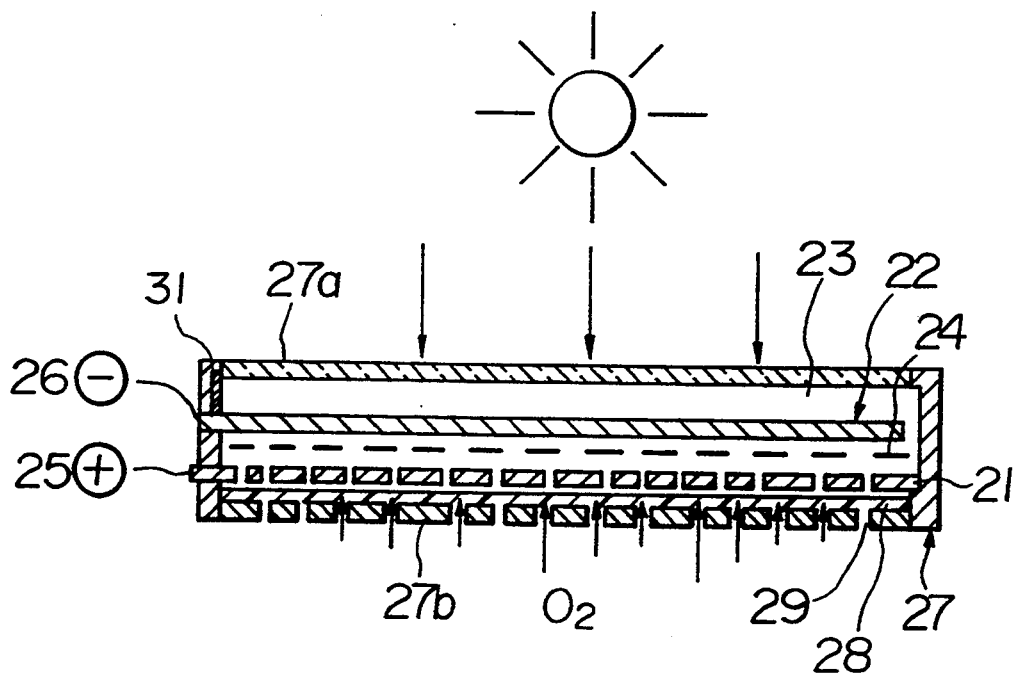
FIG. 17 shows a cross-sectional view of a photochargeable air battery according to a ninth preferred embodiment of the present invention.

FIG. 17 shows the ninth preferred embodiment. In the ninth preferred embodiment, light receptor 27a of battery case 27 is constructed using photoreceptor 30, as in this case, photoreceptor 30 is constructed as part of the battery case. The remaining construction is the same as in the sixth preferred embodiment. In addition, the construction described in the aforementioned seventh preferred embodiment may also be used.

The photochargeable air battery of the aforementioned eighth preferred embodiment is constructed in a manner such that irradiated light reaches the photoelectrode 30 without passing through electrolyte 23, and thus no portion of the irradiated light is absorbed by electrolyte 23. As a result, the photocharging efficiency of the photochargeable air battery of the eighth preferred embodiment can be improved when compared with the photochargeable air battery of the sixth and seventh preferred embodiments.

In the photochargeable air battery of the aforementioned ninth preferred embodiment, the photocharging efficiency can be further improved as a result of a construction in which irradiated light directly reaches the photo-electrode 30 without passing through electrolyte 23 in addition to light receptor 27a portion of battery case 27.

In addition, as stated above, in the photochargeable air battery of the eighth and ninth preferred embodiments, as a result of a construction in which irradiated light reaches photo-electrode 30 without passing through electrolyte 23, it is possible to select material possessing light absorptability as the electrolyte 23.

In the following, a simplified summary will be given outlining the action of the photochargeable air battery of the aforementioned sixth through ninth preferred embodiments during charging and discharging. During discharging, metal material 22a forming negative electrode 22 and the hydroxide ions in electrolyte 23 reacts at negative electrode 22, producing metal oxide and water as well as supplying electrons via negative electrode terminal 26 from metal material 22a to the load.

On the other hand, at positive electrode 21, at the three-phase boundary formed by oxygen taken in from the air, electrolyte 23, and the oxygen catalyst (positive electrode) 21, oxygen, water, and electrolyte 23, and electrons supplied (discharged) from the negative electrode 22 via the load, react to produce hydroxide ions. In this discharging reaction, decrease of electrolyte 23 does not occur because of the resultant cancellation of the reactions occurring in the entire battery, at the positive electrode 21 and negative electrode 22. Additionally, there is no problem with consumption of oxygen, the positive electrode active material, because oxygen is taken in from the air via side 27b of battery case 27. As a result, metal material 22a of negative electrode 22 is transformed by means of the present discharging reaction and metal oxide is produced from this metal material 22a. Consequently, charging of the photochargeable air battery of the present embodiment is nothing more than reducing the aforementioned metal oxide.

During charging, light energy from the sun, fluorescent lamps, and the like irradiates onto the surface of photo-electrode 30 wherein an energy band bends upwards towards electrolyte 23 at the contact surface of photo-electrode 30 formed from an N-type semiconductor, and electrolyte 23, exciting electrons to the conduction band of photo-electrode 30, and thus forming a hole in the valence electron band. This hole which accompanies the aforementioned bending of the energy band, is transferred towards electrolyte 23, and reacts with hydroxide ions on the surface of negative electrode 22 producing oxygen and water. On the other hand, the electrons excited to the conduction band which accompany the bending of the band, are transferred to metal material 22a of negative electrode 22 via communication member 31, in the end reaching the surface of metal material 22a contacting electrolyte 23. The aforementioned electrons react with the water in electrolyte 23, producing hydroxide ions in addition to reducing metal oxides which are discharge products of metal material 22a. Through the aforementioned process, the photocharging process is facilitated.

The construction of the photochargeable air battery becomes complex due to the provision of photo-electrode 30 formed from an N-type semiconductor communicating electrically with negative electrode 22. However, because photo-electrode 30 is provided separately from negative electrode 22, as the active material, a superior photo-electrode 30 which is formed from an N-type semiconductor most fitted to the metal material 22a forming negative electrode 22, can be used, and a photochargeable air battery with an improved light conversion efficiency can be obtained.

(Experiment 2)

Platinum (Pt), a cobalt plate synthesized by sintering 2 g of cobalt (Co) particles, and gallium phosphide (GaP) were used in the oxygen catalyst of positive electrode 21, the metal material 22a of negative electrode 22, and photo-electrode 30, respectively. Positive electrode 21 is formed from carbon and platinum, which is coated around the periphery of the carbon. Furthermore, as electrolyte 23, 1 mole/liter of potassium hydroxide (KOH) was used. The GaP—Co|KOH|Pt($O_2$)-type photochargeable air battery of the sixth preferred embodiment having a diameter of 25 mm and a thickness of 4 mm was tested, and this tested photochargeable air battery was found to function as a photochargeable air battery possessing both photocharging and atmospheric oxygen discharging capabilities.

Figure 18:
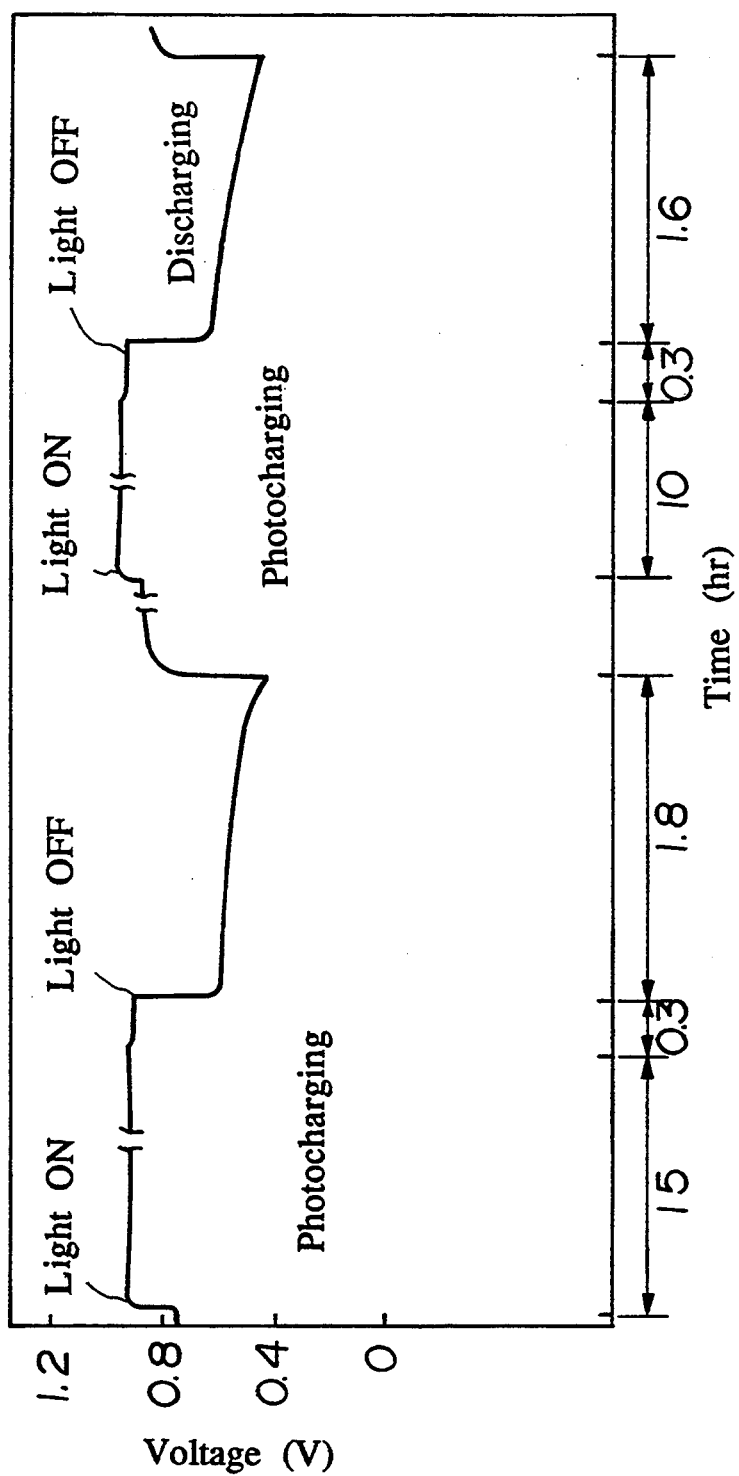
FIG. 18 is a graph showing the measured results of the battery voltage and electrode electric potential according to a $GaP—Co|KOH|Pt(O_2)$-type photochargeable air battery used in experiment 2 of the present invention.

The measured results of the charging and discharging behavior of the above tested GaP—Co/$O_2$-type photochargeable air battery are shown in FIG. 18. In FIG. 18, the voltage value over elapsed time shows the series of measurements corresponding to each of the following measured states: open→photocharging→open→discharging→open→photocharging→open→discharging→open.

In FIG. 18, the sudden increases of the battery voltage to near 1 V are periods of voltage recovery by means of charging. From the results of the present invention, battery voltage recovery was observed as a result of irradiated light reaching the photo-electrode surface, and thus repeated charging/discharging capabilities were confirmed. Additionally, the battery tested in the present experiment displayed a superior longevity without decrease in the discharging capacity even after repeated photocharging and discharging.

A xenon (Xe) lamp light source was used in measuring the aforementioned charging/discharging behavior. In addition, the purpose of the battery tested and measured in the present experiment was simply to confirm photocharging/discharging capabilities, and thus the aforementioned discharge capacity increased over a wide range in accordance with the porosity and the most fit design of metal material 22a of negative electrode 22.

Figure 19:
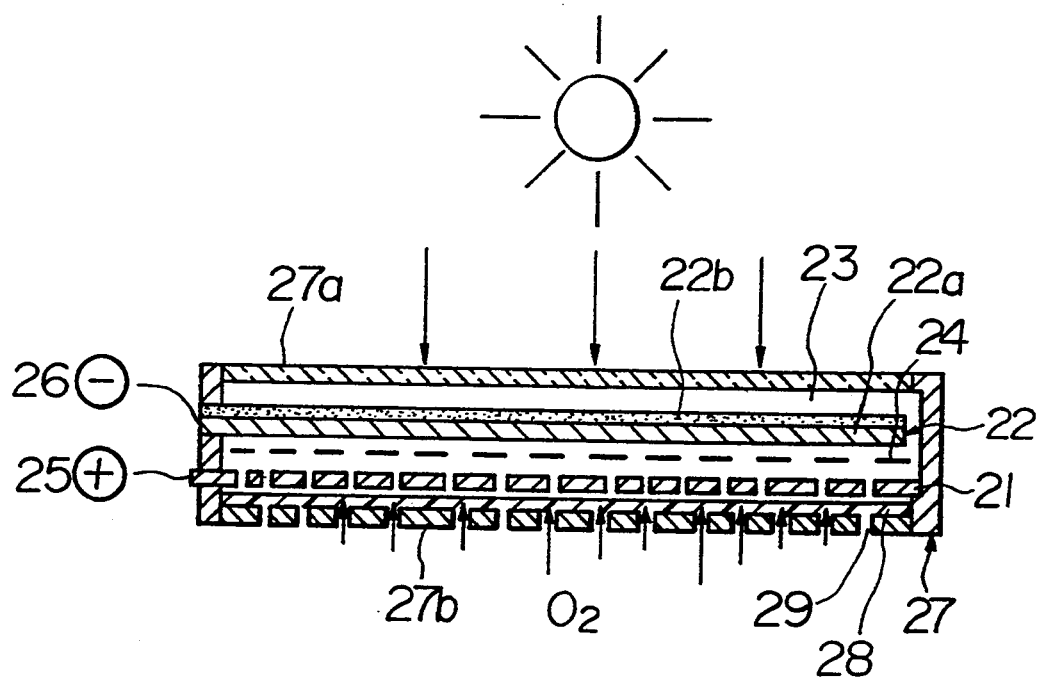
FIG. 19 shows a cross-sectional view of a photochargeable air battery according to a tenth preferred embodiment of the present invention.
Figure 20:
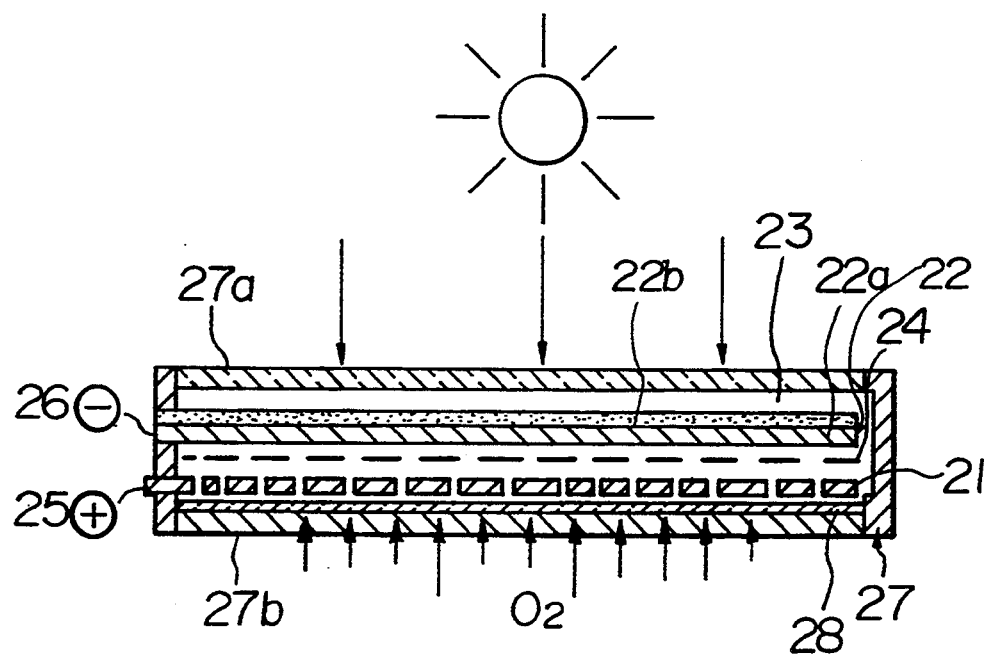
FIG. 20 shows a cross-sectional view of a photochargeable air battery according to an eleventh preferred embodiment of the present invention.
Figure 21:
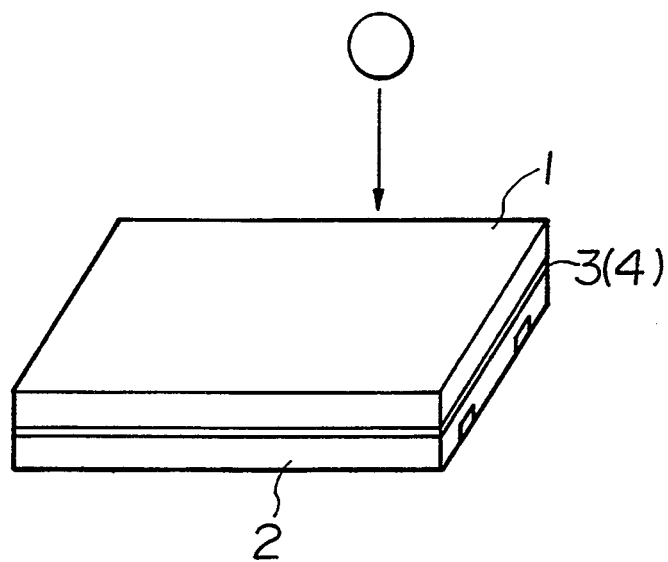
FIG. 21 shows a perspective view of a prior art photochargeable battery.
Figure 22:
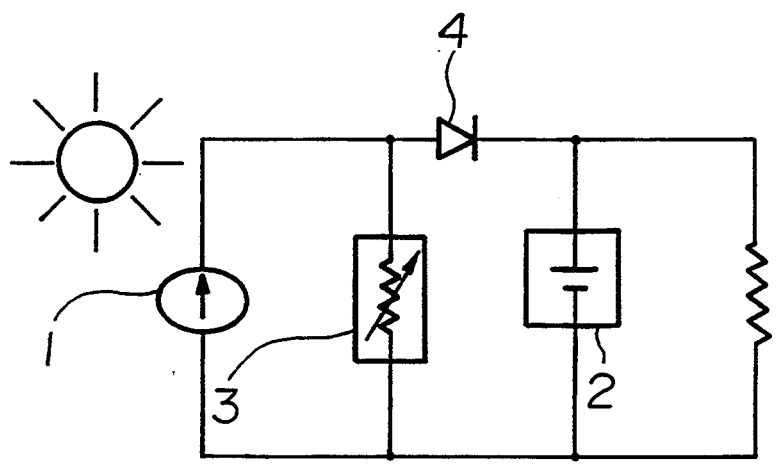
FIG. 22 shows the equivalent circuit of FIG. 21.
Figure 23:
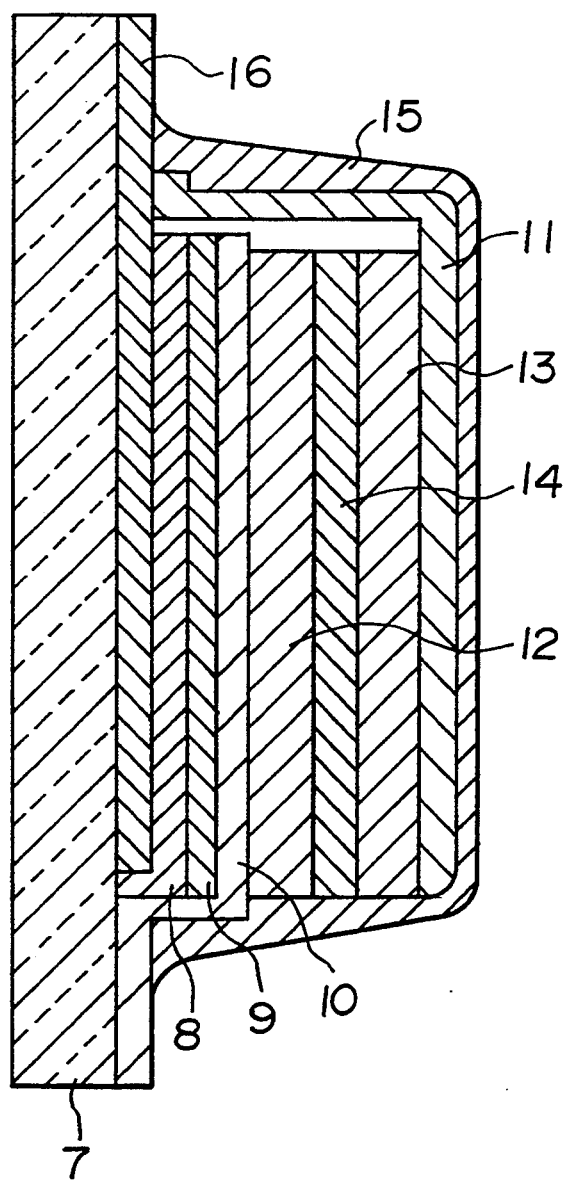
FIG. 23 shows a structural view of a prior art photochargeable battery.
Figure 24:
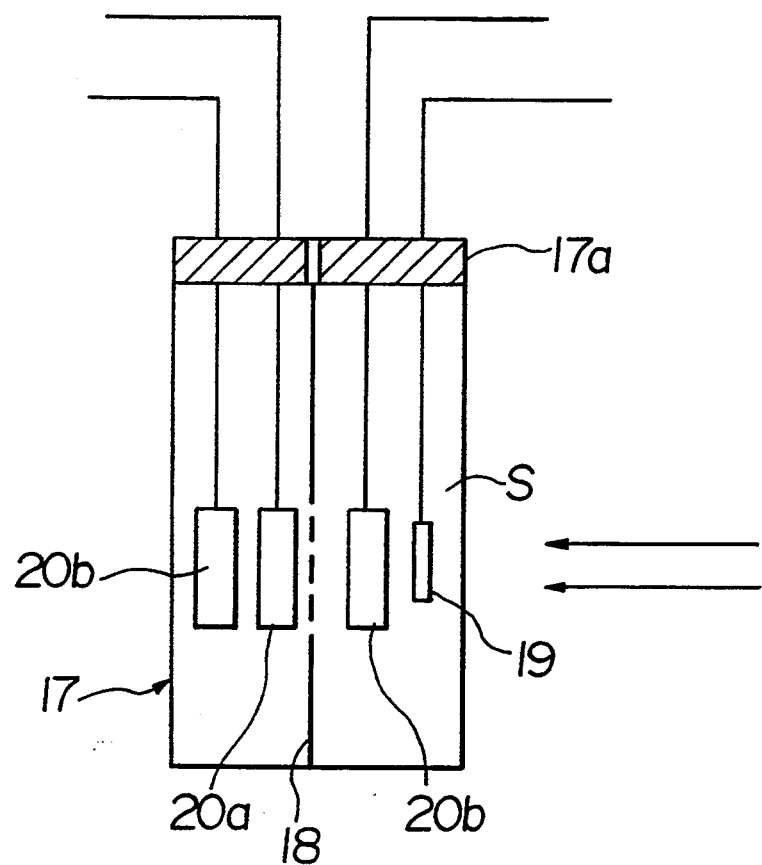
FIG. 24 shows a structural view of a prior art photochemical chargeable battery.
Figure 25:
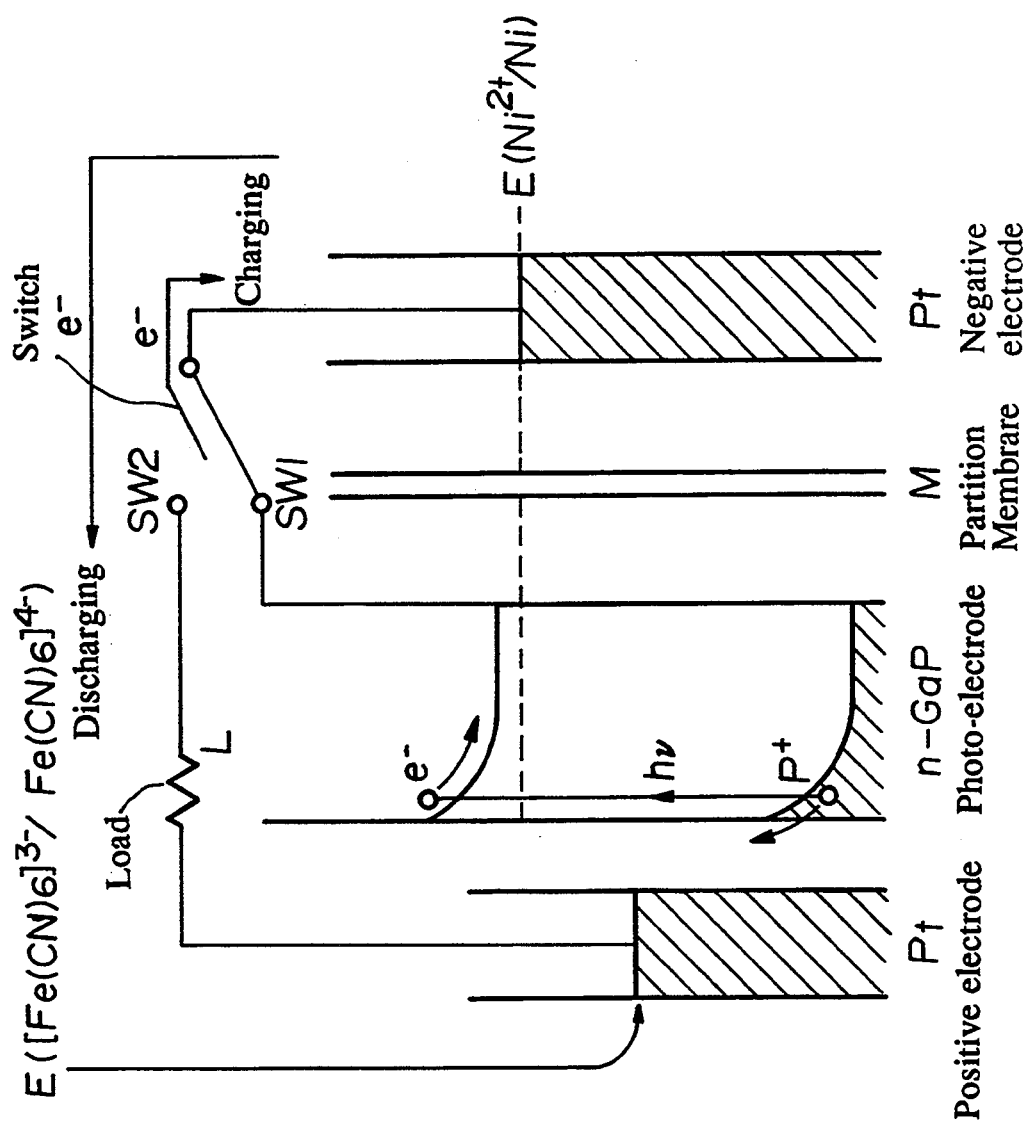
FIG. 25 shows a simple structure and energy level of a prior art photochemical chargeable battery.

FIGS. 19 and 20 show photochargeable air battery of the tenth and eleventh preferred embodiments of the present invention. In the FIGS. numeral 21 is a positive electrode formed from a porous oxygen catalyst, 22 is a negative electrode, 22a is metal material which forms negative electrode, 22b is an N-type semiconductor which together with the metal material forms negative electrode, 23 is an electrolyte which contacts with the aforementioned positive electrode 21 and negative electrode 22, 24 is a separator, 25 is a positive electrode terminal, 26 is a negative electrode terminal, 27 is a battery case, and 28 is a water-repellent film.

In the tenth and eleventh preferred embodiments shown in FIGS. 19 and 20, constructions are described in which metal material 22a and N-type semiconductor 22b are combined to form the negative electrode without using a photo-electrode. The remaining structures are as described respectively in the aforementioned sixth and seventh preferred embodiments. In the tenth and eleventh preferred embodiments, the negative electrode (into which N-type semiconductor is incorporated) is equipped with the functionality and effects of a photo-electrode, thus in comparison with the sixth and seventh preferred embodiments which require 3 electrodes, a 2-electrode structure can be achieved, thus simplifying the overall battery construction.

Furthermore, in all of the sixth through eleventh preferred embodiments, as in the fourth embodiment shown in FIG. 6, a construction in which positive electrode 21 is provided on the perimeter of the side face of the photochargeable air battery, improving the high rate discharging capability, can also be achieved.

What is claimed is:

1. A photochargeable air battery Comprising:
   a positive electrode comprising an oxygen catalyst;
   a negative electrode comprising a metal, metal oxide, metal alloy, or metal complex;
   electrolyte for communicating said positive electrode and said negative electrode; and
   a battery case for housing said negative electrode, said positive electrode and said electrolyte so that external light is irradiated onto said negative electrode;
   wherein said photochargeable air battery is discharged by means of oxidation of said negative electrode, and is charged by means of reducing said negative electrode using light energy,
   wherein said battery case comprises a means for containing said electrolyte and for allowing contact of air to said positive electrode, said containing means including an oxygen permeable material.

2. A photochargeable air battery according to claim 1, wherein a means is provided between said positive electrode and said containing means for preventing outward flow and permeation of said electrolyte.

3. A photochargeable air battery according to claim 2, wherein diffusion paper for uniformly diffusing oxygen over the surface of said positive electrode is provided between said preventing means and said containing means.

4. A photochargeable air battery according to claim 1, wherein said positive electrode comprises an oxygen catalyst and a means for preventing outward flow and permeation of said electrolyte via said containing means.

5. A photochargeable air battery according to claim 1, wherein diffusion paper for uniformly diffusing oxygen over the surface of said positive electrode is provided between said positive electrode and said containing means.

6. A photochargeable air battery comprising:
   a positive electrode;
   a negative electrode comprising a metal, metal oxide, metal alloy, or metal complex;
   a photo-electrode comprising a N-type semiconductor electrically communicating to said negative electrode;
   electrolyte for communicating said positive electrode and said negative electrode; and
   a battery case for housing said negative electrode, said positive electrode and said electrolyte so that external light is irradiated onto said photo-electrode;
   wherein said photochargeable air battery is discharged by means of oxidation of said negative electrode, and is charged by means of reducing said negative electrode using light energy irradiated onto said photo-electrode.

7. A photochargeable air battery according to claim 6, wherein a side of said photo-electrode onto which light is irradiated is in contact with said battery case.

8. A photochargeable air battery according to claim 6, wherein said battery case is combined with said photo-electrode.

9. A photochargeable air battery according to one of claims 4 or 6, wherein at least one portion of said negative electrode includes one of a composite metal and alloy comprising one of an oxide of said metal and a plurality of said metals.

10. A photochargeable air battery according to claim 6, wherein a compound or a composite compound of one of metal oxide, nitride, carbide and hydroxide formed by contact of said metal, metal oxide, metal alloy, or metal complex with one of oxygen, nitrogen and carbon dioxide in the air, and said electrolyte is incorporated in said negative electrode.

11. A photochargeable air battery according to claim 6, wherein said positive electrode comprises an oxygen catalyst.

12. A photochargeable air battery according to claim 11, wherein said battery case comprises a means for containing said electrolyte and for allowing contact of air to said positive electrode, said containing means having air holes in the vicinity of said positive electrode.

13. A photochargeable air battery according to claim 11, wherein said battery case comprises a means for containing said electrolyte and for allowing contact of air to said positive electrode, said containing means being made of an oxygen permeable material.

14. A photochargeable air battery according to one of claims 12 or 13, wherein said positive electrode comprises an oxygen catalyst and a means for preventing outward flow and permeation of said electrolyte.

15. A photochargeable air battery according to one of claims 12 or 13, further including means, between said positive electrode and said containing means, for preventing outward flow and permeation of said electrolyte via the containing means of said battery case.

16. (Amended) A photochargeable air battery according to claim 15, wherein diffusion paper for uniformly diffusing oxygen over the surface of said positive electrode is provided between said preventing means and said containing means.

17. A photochargeable air battery according to claim 11, wherein diffusion paper for uniformly diffusing oxygen over the surface of said positive electrode is provided between said positive electrode and said containing means.

* * * * *

UNITED STATES PATENT AND TRADEMARK OFFICE
CERTIFICATE OF CORRECTION

PATENT NO. : 5,346,785
DATED : September 13, 1994
INVENTOR(S) : Keiji AKUTO et al.

It is certified that error appears in the above-indentified patent and that said Letters Patent is hereby corrected as shown below:

Claim 1, Column 15, Line 49 change "Comprising" to --comprising--.

Claim 16, Column 18, Line 1 delete "(Amended)".

Signed and Sealed this

Second Day of May, 1995

Attest:

BRUCE LEHMAN

Attesting Officer     Commissioner of Patents and Trademarks